(12) United States Patent
Miyahara et al.

(10) Patent No.: US 6,435,590 B2
(45) Date of Patent: *Aug. 20, 2002

(54) SEAT DEVICE OF A VEHICLE

(75) Inventors: Tamio Miyahara; Kazuhiro Matsuhashi; Masahiro Maruyama; Yasukazu Watanabe; Akira Itoh, all of Hiroshima (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/954,735

(22) Filed: Sep. 18, 2001

Related U.S. Application Data

(63) Continuation of application No. 09/618,777, filed on Jul. 18, 2001, now abandoned, which is a continuation of application No. 09/260,399, filed on Mar. 1, 1999, now Pat. No. 6,129,405.

(30) Foreign Application Priority Data

Mar. 3, 1998 (JP) ............................. 10-50962

(51) Int. Cl.[7] ................................................. B60N 2/00
(52) U.S. Cl. ................................ 296/65.11; 296/65.05; 296/65.13
(58) Field of Search .......................... 296/65.11, 65.12, 296/65.13, 65.14, 65.03; 248/429, 503.1

(56) References Cited

U.S. PATENT DOCUMENTS

| 4,341,415 A | 7/1982 | Braun et al. ............... 296/65 R |
| 4,479,752 A | 10/1984 | Todd ........................... 414/462 |
| 4,483,504 A | 11/1984 | Duwelshoft ................. 248/429 |

(List continued on next page.)

FOREIGN PATENT DOCUMENTS

| BE | 899 282 | 7/1984 | |
| EP | 0 331 241 | 2/1989 | |
| EP | 0 615 879 A1 | 3/1994 | |
| JP | 58-67526 | 4/1983 | |
| JP | 61-37547 | 2/1986 | ............ B60N/1/06 |
| JP | 5-40029 | 5/1993 | ............ B60N/2/36 |
| JP | 9-207637 | 8/1997 | |

OTHER PUBLICATIONS

European Search Report, Appln. No. 99103743.3, Applicant: Mazda Motor Corporation, 4 pages.

Winterhagen J: "Der Eurovan Von Fiat und PSA Eurovan from Fiat and PSA," *ATX Automobiltechnische Zeitschrift*, vol. 96, Nr. 10, pp. 620–621, Oct. 1994, Stuttgart, DE.

*Primary Examiner*—Joseph D. Pape
*Assistant Examiner*—Patricia Engle
(74) *Attorney, Agent, or Firm*—Sidley Austin Brown & Wood; Hugh A. Abrams

(57) ABSTRACT

A seat device of a vehicle including a substantially flat floor surface substantially extending across a full cabin space of the vehicle, front row seats, center row seats and a rear row seat disposed in a longitudinal direction of the vehicle on the floor surface, a seat storage pan extending rearward the rear row seat and downward a level of the floor surface, the front row seats being disposed with a space, the center row seats including a plurality of seats in which at least one of the seats is movable in a lateral direction of the vehicle. When the rear row seat is received in the seat storage pan, a substantially flat and continuous surface of a substantially same level as the floor surface is formed rearward the center row seats to a rear end of the cabin space with a substantially full width of the cabin space. When the center row seats are disposed offset to one side of the vehicle with regard to the lateral direction, a substantially flat and continuous surface of a substantially same level as the floor surface is formed rearward the front row seats to a rear end of the cabin space. When the center row seats are disposed to produce a space at a central portion of the vehicle in the lateral direction, a substantially flat and continuous surface of a substantially same level as the floor surface is formed rearward the front row seats to a rear end of the cabin space at a central portion of the cabin space in the lateral direction.

9 Claims, 22 Drawing Sheets

U.S. PATENT DOCUMENTS

| | | |
|---|---|---|
| 5,269,581 A | 12/1993 | Odagaki et al. ............... 296/66 |
| 5,522,665 A | 6/1996 | Baloche et al. ............... 384/47 |
| 5,605,368 A | 2/1997 | Noma et al. ................. 296/64 |
| 5,636,884 A | 6/1997 | Ladetto et al. ............. 296/65.1 |
| 5,765,894 A | 6/1998 | Okazaki et al. ............ 296/65.1 |
| 5,769,480 A | 6/1998 | Gebhardt ................... 296/65.1 |
| 5,839,773 A | 11/1998 | Ban et al. ................ 296/65.09 |
| 5,868,451 A | 2/1999 | Uno et al. .................... 296/66 |
| 5,915,660 A | 6/1999 | Kanda ........................ 248/430 |
| 5,927,789 A | 7/1999 | Mezzadri et al. ............. 296/64 |
| 6,145,913 A * | 11/2000 | Odagaki .................. 296/65.11 |

\* cited by examiner

FRONT

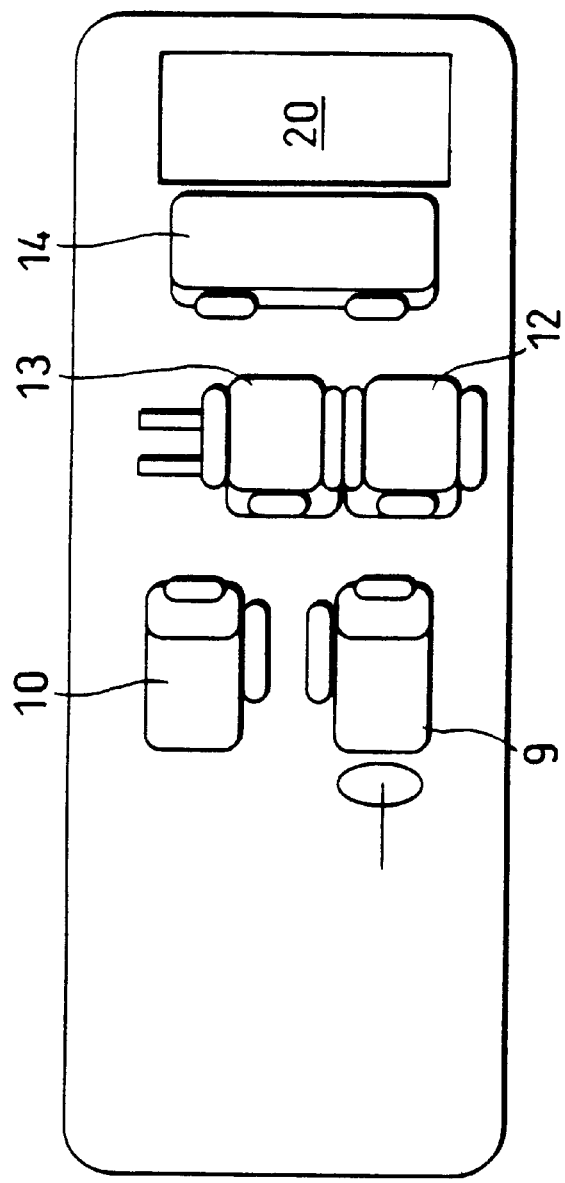
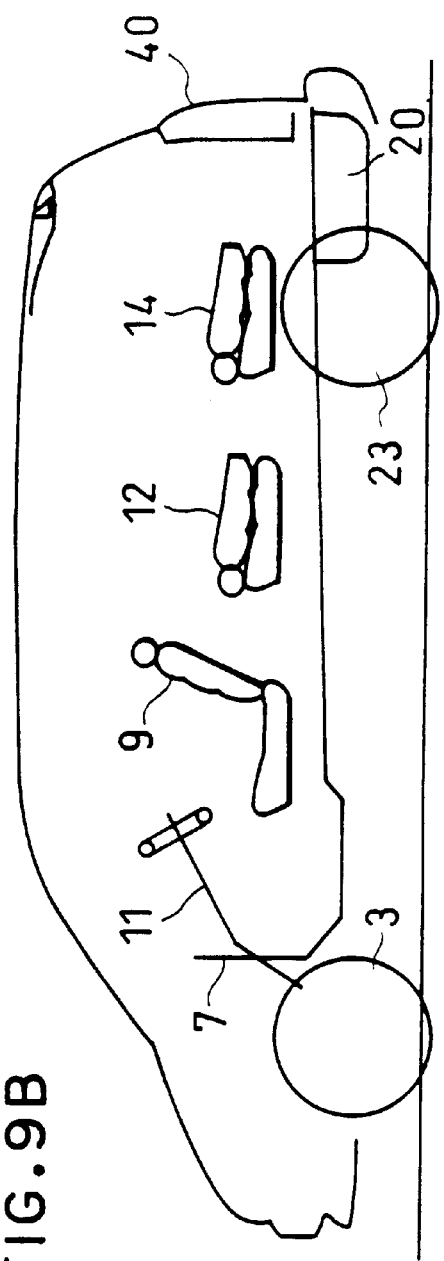
FIG.9A
FIG.9B

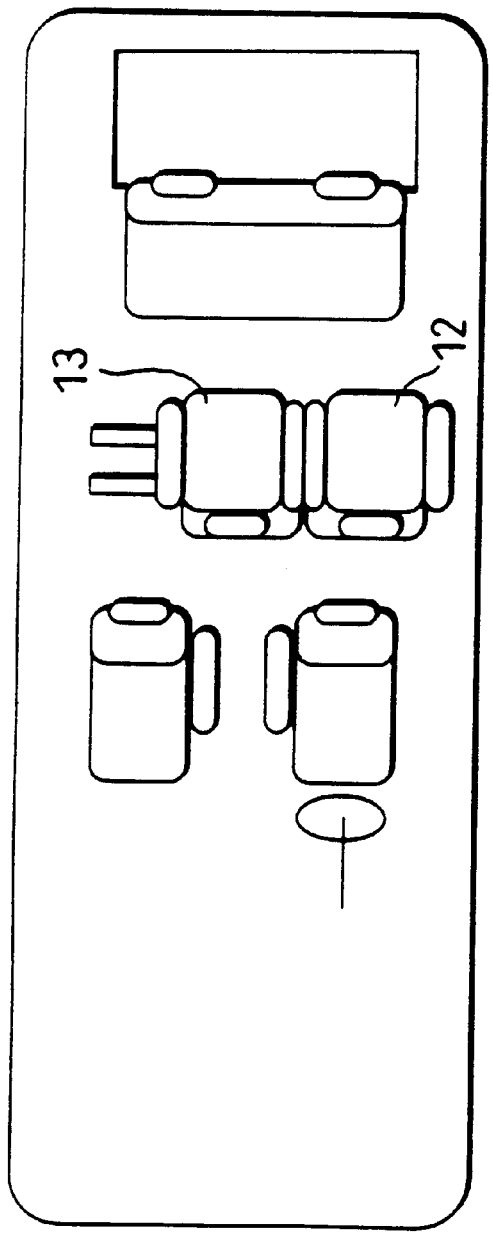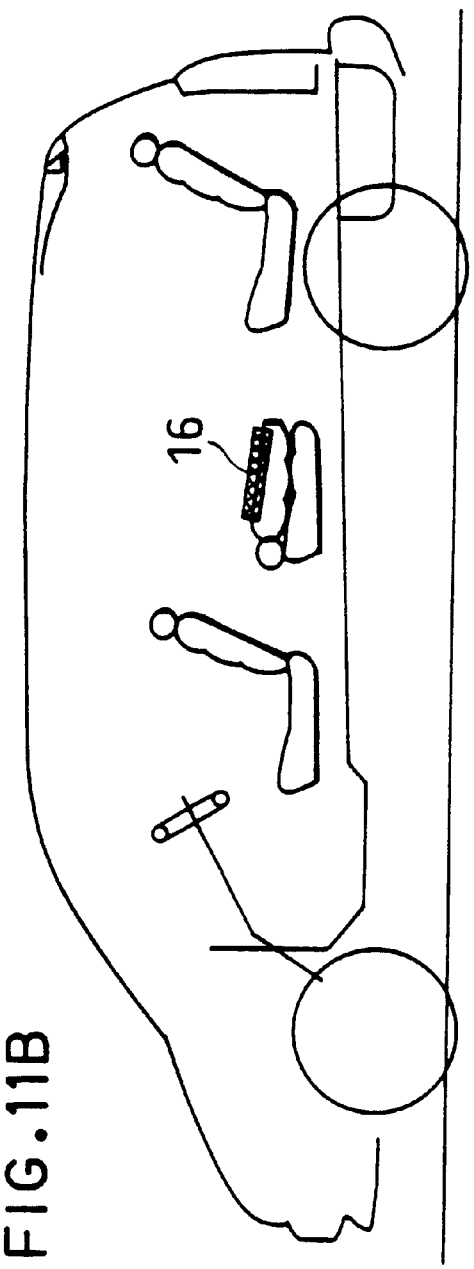
FIG.11A
FIG.11B

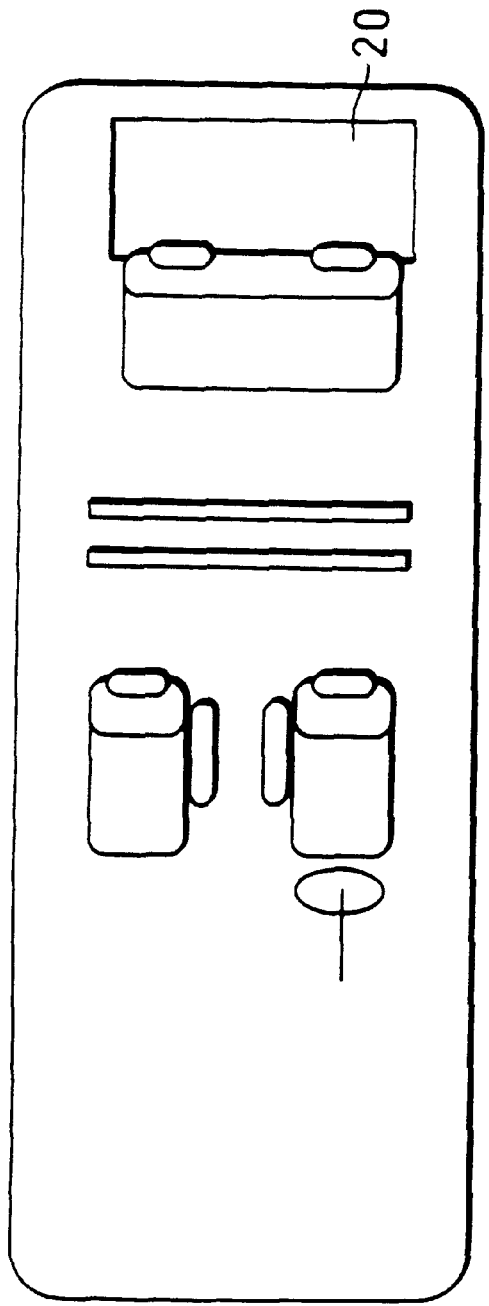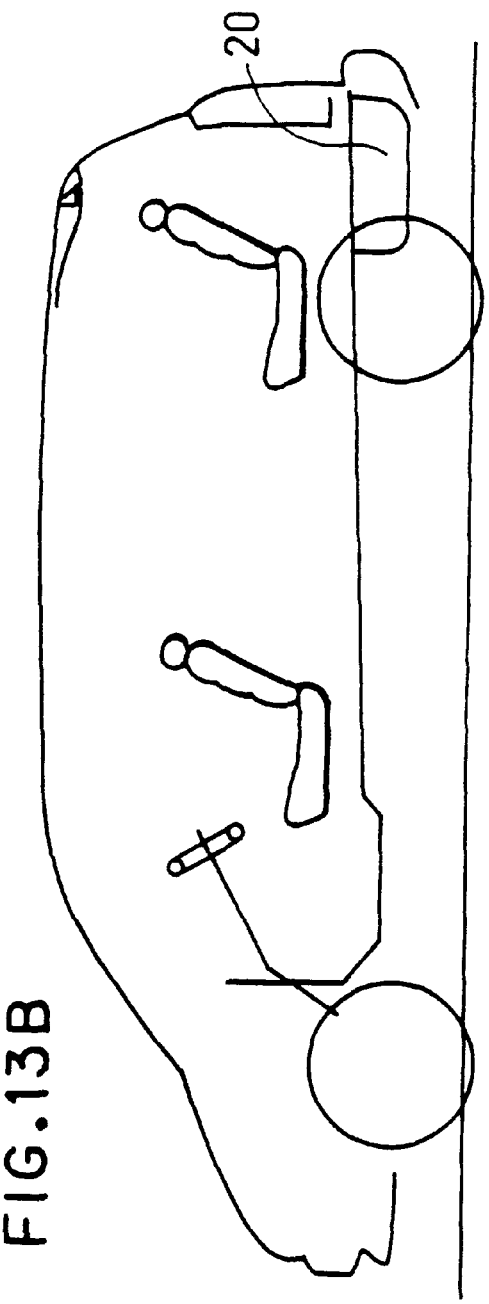
FIG.13A
FIG.13B

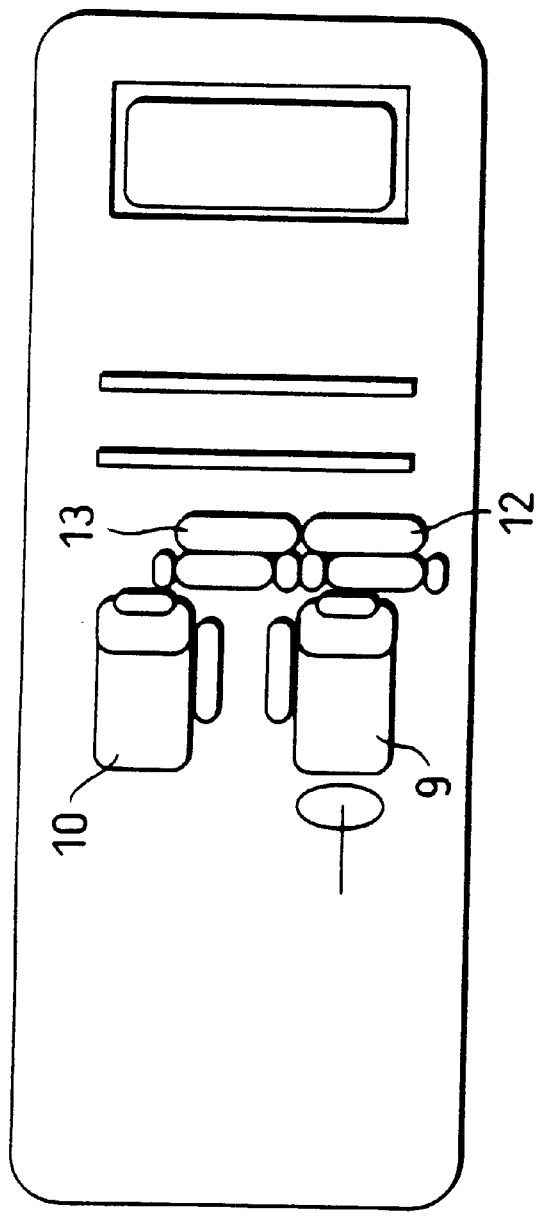
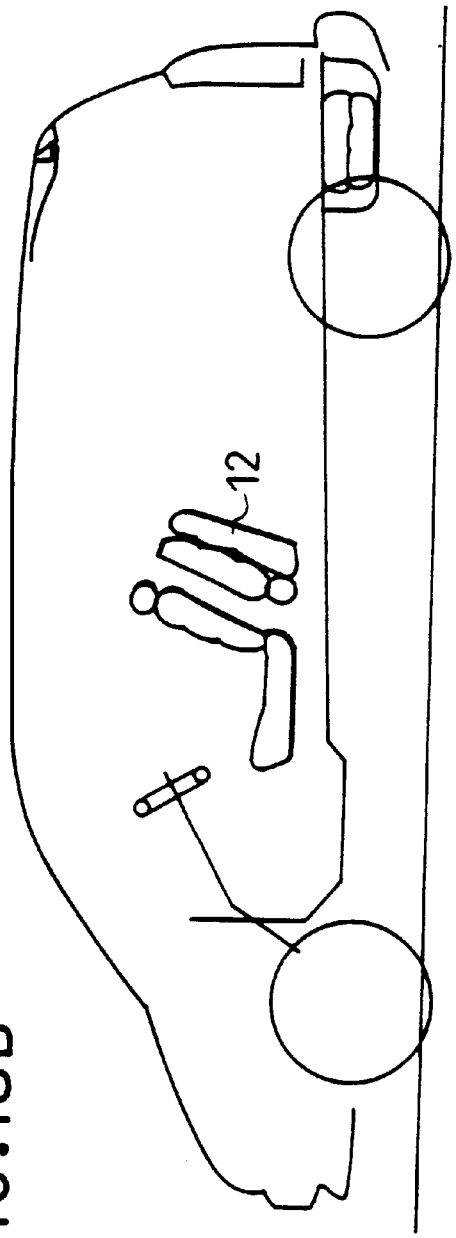
FIG.18A
FIG.18B

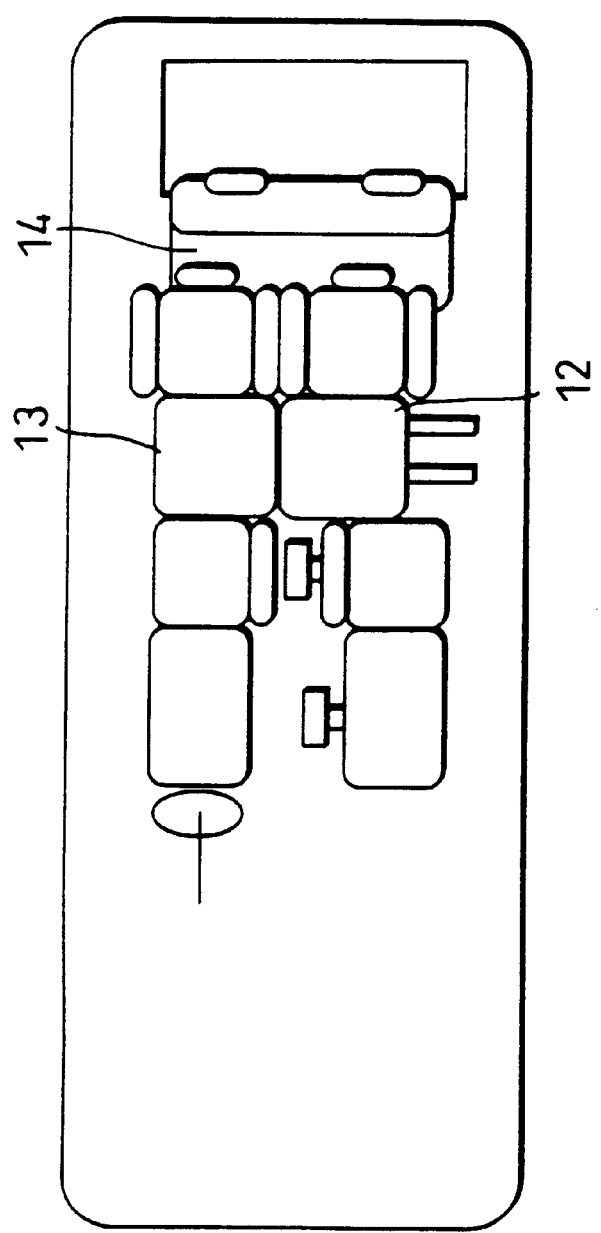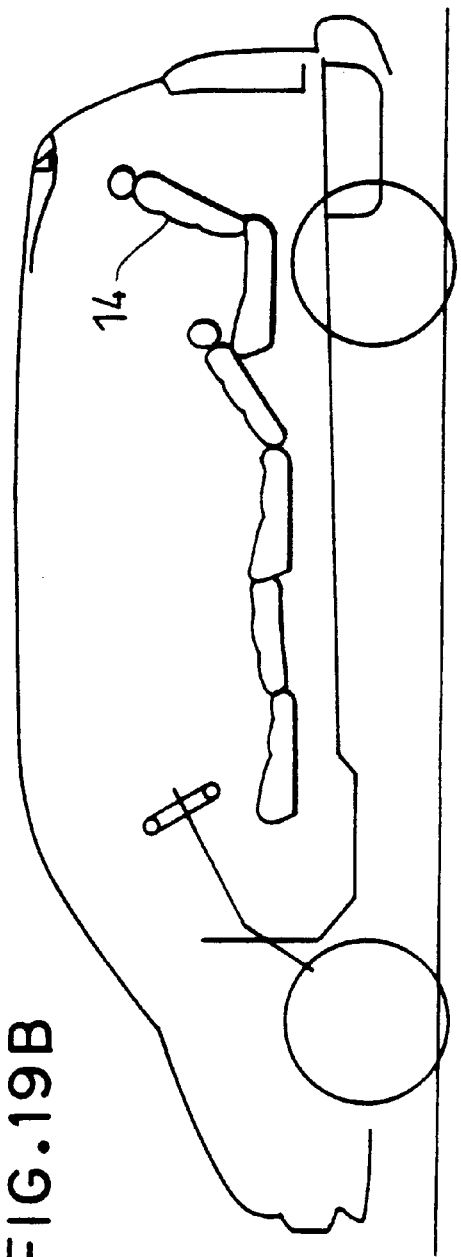
FIG.19A
FIG.19B

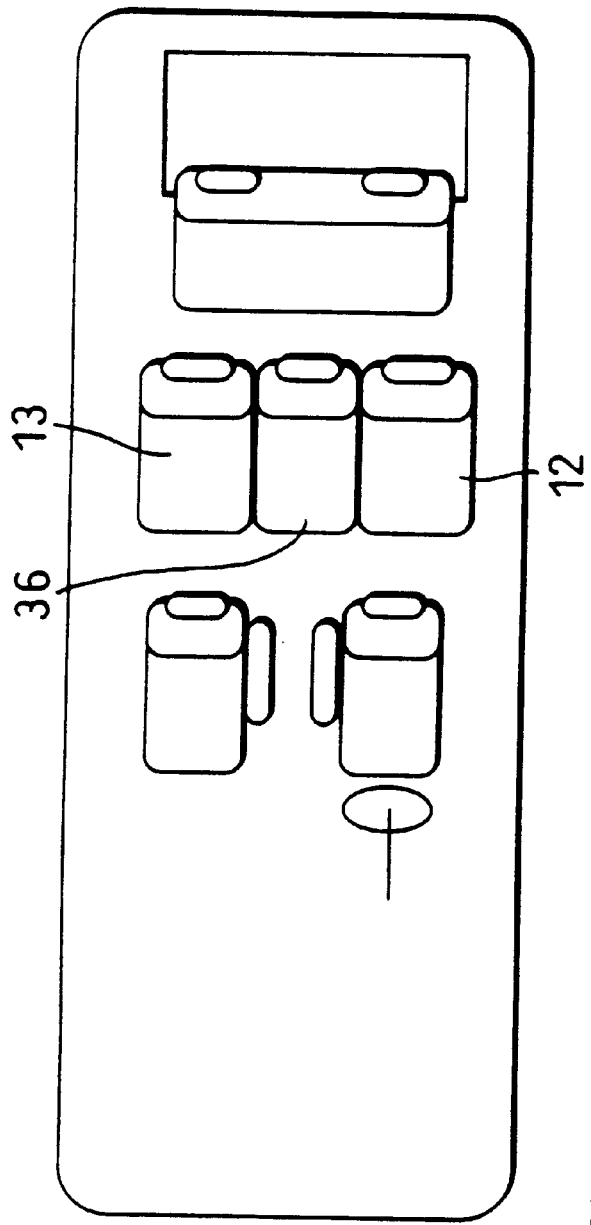
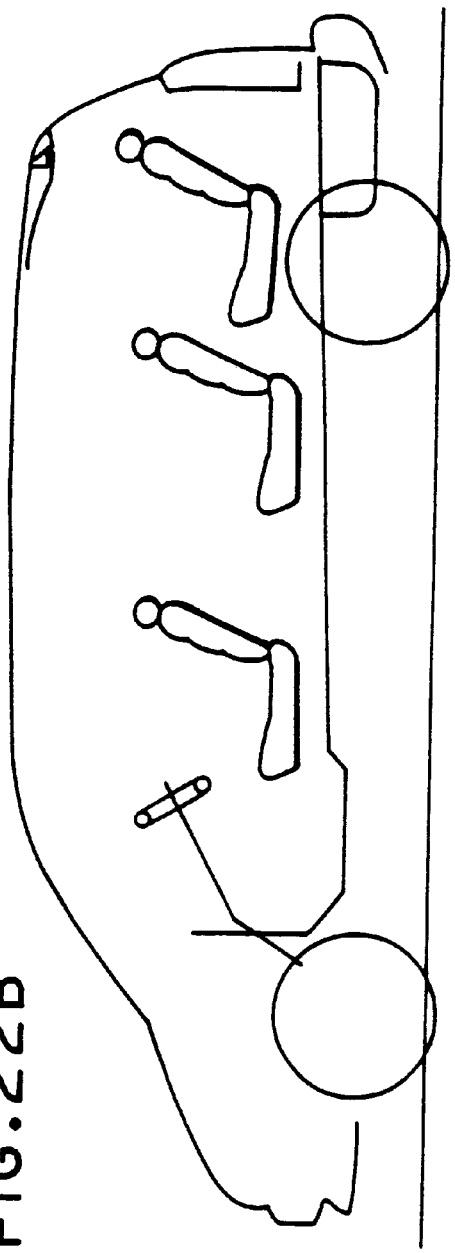
FIG.22A
FIG.22B

SEAT DEVICE OF A VEHICLE

This is a continuation application of Ser. No. 09/618,777, filed Jul. 18, 2000, now abandoned, which is a continuation application of Ser. No. 09/260,399, filed Mar. 1, 1999, now U.S. Pat. No. 6,129,405.

BACKGROUND OF THE INVENTION

1. Field of the Invention

The present invention relates to a seat device of a vehicle, in particular, a seat device of a vehicle which is provided with a flat floor across a substantially entire seating area.

2. Related Art

A seat device as disclosed in a Japanese Un-examined Patent Application publication No.61-37547 has been known. The seat device disclosed in the Japanese publication is provided with a seat which is movable in not only a longitudinal direction of the vehicle but also a lateral direction thereof and rotatable so as to improve an operation performance of the seat device. A Japanese Utility Model Un-examined publication No. 5-40029 discloses a seat device in which a rear seat can be folded and retracted in a recess formed at a rear portion in a cabin space. In this structure, when the seat is retracted, a bottom surface of a seat cushion of the seat is substantially aligned with a floor level of the vehicle.

With this structure, it is advantageous in that when retracted, the cabin space is open to various usage, namely, the availability of the cabin space is enhanced.

It should, however, be noted that the structure as disclosed in the Japanese Utility Model publication is still disadvantageous in availability of the cabin space as a whole although the rear portion the space can be improved in its operability.

SUMMARY OF THE INVENTION

Therefore, it is an object of the invention is to solve the above inconvenience of the conventional seat device of the vehicle.

In other words, it is an object of the present invention to provide a vehicle seat device which can improve the operability of the cabin space of the vehicle as a whole in a vehicle which is provided with a floor surface across a substantially entire cabin space. The above and other objects of the present invention can be accomplished by a seat device of a vehicle comprising a substantially flat floor surface substantially extending across a full cabin space of the vehicle, front row seats, center row seats and a rear row seat disposed in a longitudinal direction of the vehicle on the floor surface, a seat storage pan extending rearward the rear row seat and downward a level of the floor surface, the front row seats being disposed with a space, the center row seats including a plurality of seats in which at least one of the seats is movable in a lateral direction of the vehicle, when the rear row seat is received in the seat storage pan, a substantially flat and continuous surface of a substantially same level as the floor surface being formed rearward the center row seats to a rear end of the cabin space with a substantially full width of the cabin space, when the center row seats are disposed offset to one side of the vehicle with regard to the lateral direction, a substantially flat and continuous surface of a substantially same level as the floor surface being formed rearward the front row seats to a rear end of the cabin space, and when the center row seats are disposed to produce a space at a central portion of the vehicle in the lateral direction, a substantially flat and continuous surface of a substantially same level as the floor surface being formed rearward the front row seats to a rear end of the cabin space at a central portion of the cabin space in the lateral direction.

In a preferred embodiment, the front row seats include a driver's seat and an assistant's seat, the assistant's seat being movable in the longitudinal direction, and at least one of the center row seats which is disposed at a side of the assistant's seat in the lateral direction being movable in the lateral direction.

It is preferred that the center row seats are movable in both the longitudinal and lateral directions, and a longitudinal sliding mechanism for allowing a longitudinal movement of the center row seats being disposed over a lateral sliding mechanism for allowing a lateral movement of the center row seats.

Preferably, a slide rail for allowing a sliding movement of the central row seats is provided with a mechanism through which a seat is removed from the slide rail. Further, it is preferable that a door opening is formed at a longitudinal side of a vehicle corresponding the center row seats, and a side door for a sliding movement being combined with the door opening.

In another aspect of the invention, there is provided a seat device of a vehicle comprising a substantially flat floor surface substantially extending across a full cabin space of the vehicle, a front row seat, center row seat and rear row seat disposed in a longitudinal direction of the vehicle on the floor surface, each of the seats being movable in both the longitudinal and lateral directions of the vehicle through a longitudinal sliding mechanism for allowing the seat of a longitudinal movement and a lateral sliding mechanism for allowing the seat of a lateral movement, either one of the longitudinal and lateral sliding mechanisms being mounted on a body side of the vehicle, the other of the sliding mechanism being mounted on the seat so as to be moved together with the seat, and the sliding mechanism mounted on the body side of the vehicle being provided with a removable mechanism through which the seat is removed.

As mentioned above, the seats are constituted to be movable and removable so that the cabin space can be utilized in various applications. Thus, the operability of the cabin space as a whole can be drastically expanded.

Further objects, features and advantages of the present invention will become apparent from the Detailed Description of Preferred Embodiments which follows when read in light of the accompanying Figures.

BRIEF DESCRIPTION OF THE DRAWINGS

FIG. 9 is a plan view and elevation view showing a condition of the cabin;

FIG. 11 is a plan view and elevation view showing a further condition of the cabin;

FIG. 13 is a plan view and elevation view showing a further condition of the cabin;

FIG. 18 is a plan view and elevation view showing a further condition of the cabin;

FIG. 19 is a plan view and elevation view showing a further condition of the cabin;

FIG. 22 is a plan view and elevation view showing a condition of the cabin in accordance with another embodiment of the present invention;

DETAILED DESCRIPTION OF THE PREFERRED EMBODIMENTS

Figure 1:
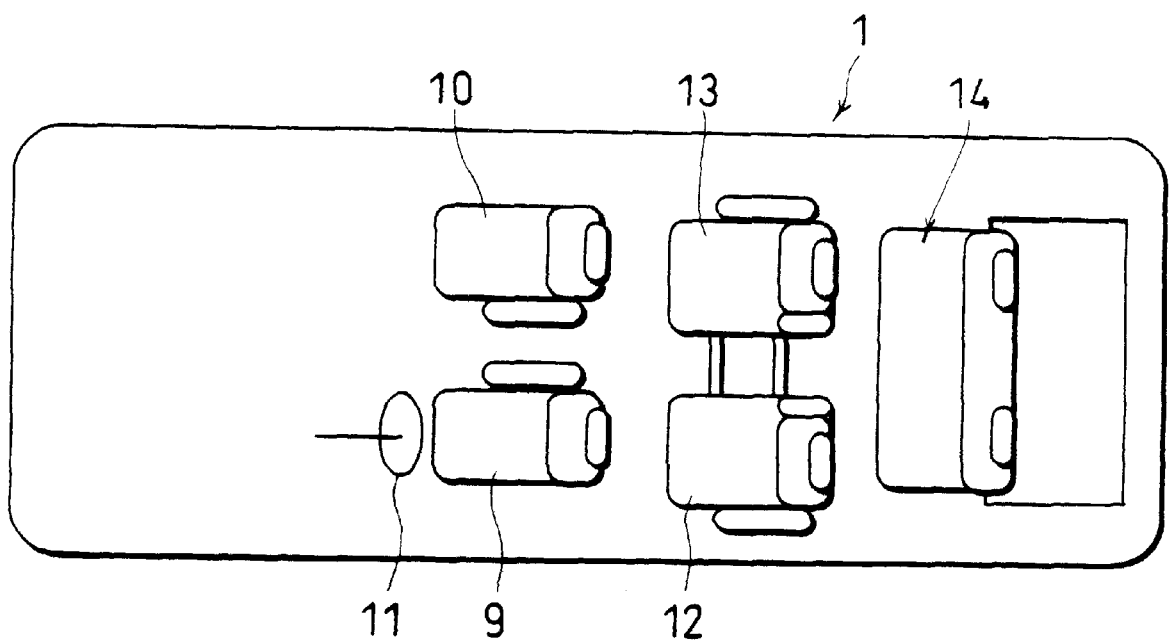
FIG. 1 is a plan view showing a cabin of a vehicle to which the present invention can be applied.
Figure 2:
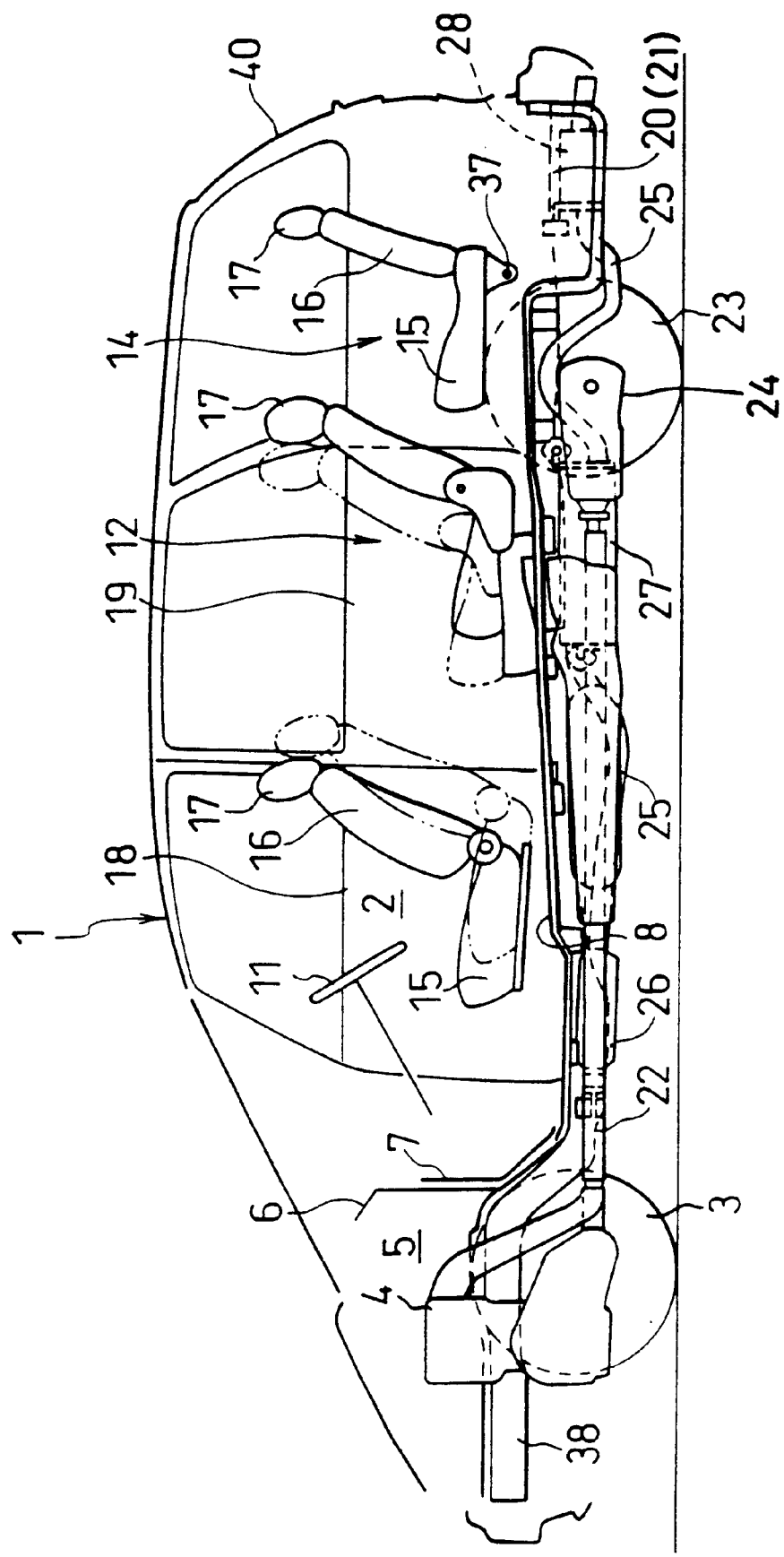
FIG. 2 is an elevation view showing a lower portion and cabin the vehicle of FIG. 1.

Hereinafter, the present invention is described in detail taking reference with the attached drawings. FIG. 1 is a plan view of a cabin 2 of a vehicle 1 to which the present invention can be applied. FIG. 2 is an elevation view showing an inside of the cabin 2 and a portion of the vehicle 1 lower than the floor, referring to FIGS. 1 and 2, between front wheels 2 disposed at a front area of the vehicle 1 is defined an engine room 5 in which an engine 4 is disposed. The engine room 5 is divided by a cowl panel 6 and a dash panel 7 from a cabin space. The illustrated vehicle 1 is of so called one box car which is provided with a floor panel which defines a substantially flat floor panel across an entire cabin space. In the cabin space, a front seat row of seats 9 and 10 is arranged in a lateral direction side by side. One of the seats 9 and 10 is a driver's seat 9 which is disposed corresponding to a steering wheel 11. The other seat 10 is an assistant's seat. A center row of seats 12, 13 are arranged rearward the front row of seats 9, 10. The seats 12, 13 are arranged side by side and movable independently from each other in a longitudinal and lateral directions of the vehicle 1 respectively. Further, a rear row of seat 14 is arranged rearward the pair of center row of seats 12 and 13. In the illustrated embodiment, the rear row of seat 14 takes a bench seat configuration and is broad enough so that three persons can be seated although head rests are provided for only two persons.

The seats 9, 10, 12, 13 and 14 are provided with seat cushions 14 and seat backs 16 which can be reclined, fixed at a desired seating angle and foldable with regard to the seat cushions 15 respectively. Each of the seats is provided with a head rest 17. At a side of the front row of the seat is provided a front door 18. A side door 19 is provided corresponding to the center row of seats 12 and 13. The side door 19 is provided as a slide door in this illustrated embodiment so that an open space is provided at a side of the center row of seats 12 and 13. There is defined a storage pan 20 extended downward the floor surface at a rear portion of the vehicle 1 so that the rear row seat 14 is retracted in the pan 20. The storage pan 20 has a width enough to receive the rear row seat 14 and has a depth to receive the seat 14 at a folded condition. An upper opening 21 of the pan 20 is closed by forming a surface aligned with the floor panel 8 when the rear seat 14 is retracted therein.

With regard to the lower structure of the floor panel 8, a propeller shaft 22 extends rearward at a central portion of the vehicle 1 from a rear end of the engine 4. A rear end of the propeller shaft 22 is joined with a differential gear device 24 of a rear wheel 23. The differential gear device 24 distributes an engine output power transmitted to the propeller shaft 22 from the engine 4 to transmit the power through rear axles to the rear wheels 23. A pair of side frames 38 extending in the longitudinal direction are provided at opposite sides of the vehicle 1. Between a wheel base of the front wheel 3 and the rear wheel 23 is provided a spare tire storage device close to one of the side portions of the vehicle 1. A fuel tank is disposed at a substantially same position as the tire storage device in the longitudinal direction of the vehicle 1, and close to the other of the side portions of the vehicle 1. With this arrangement, the propeller shaft 22 extends in the longitudinal direction between the tire storage device and the fuel tank. In this case, the propeller shaft 22 extends straight and rearward. Further, an exhaust gas pipe 25 extends rearward from the rear end of the engine 4. A catalyst converter 26 is disposed at a front position of the spare tire storage device on the exhaust gas pipe 25 for cleaning the exhaust gas. The exhaust pipe 25 is formed with an arched portion, a silencer 27 rearward of the arched portion and a sub-silencer 28 just before an end opening of the pipe.

In the illustrated structure, the front row seats 9, 10 are slidably movable in the longitudinal direction and the center row seats 12, 13 are silidably movable in both the longitudinal and lateral directions.

Figure 3:
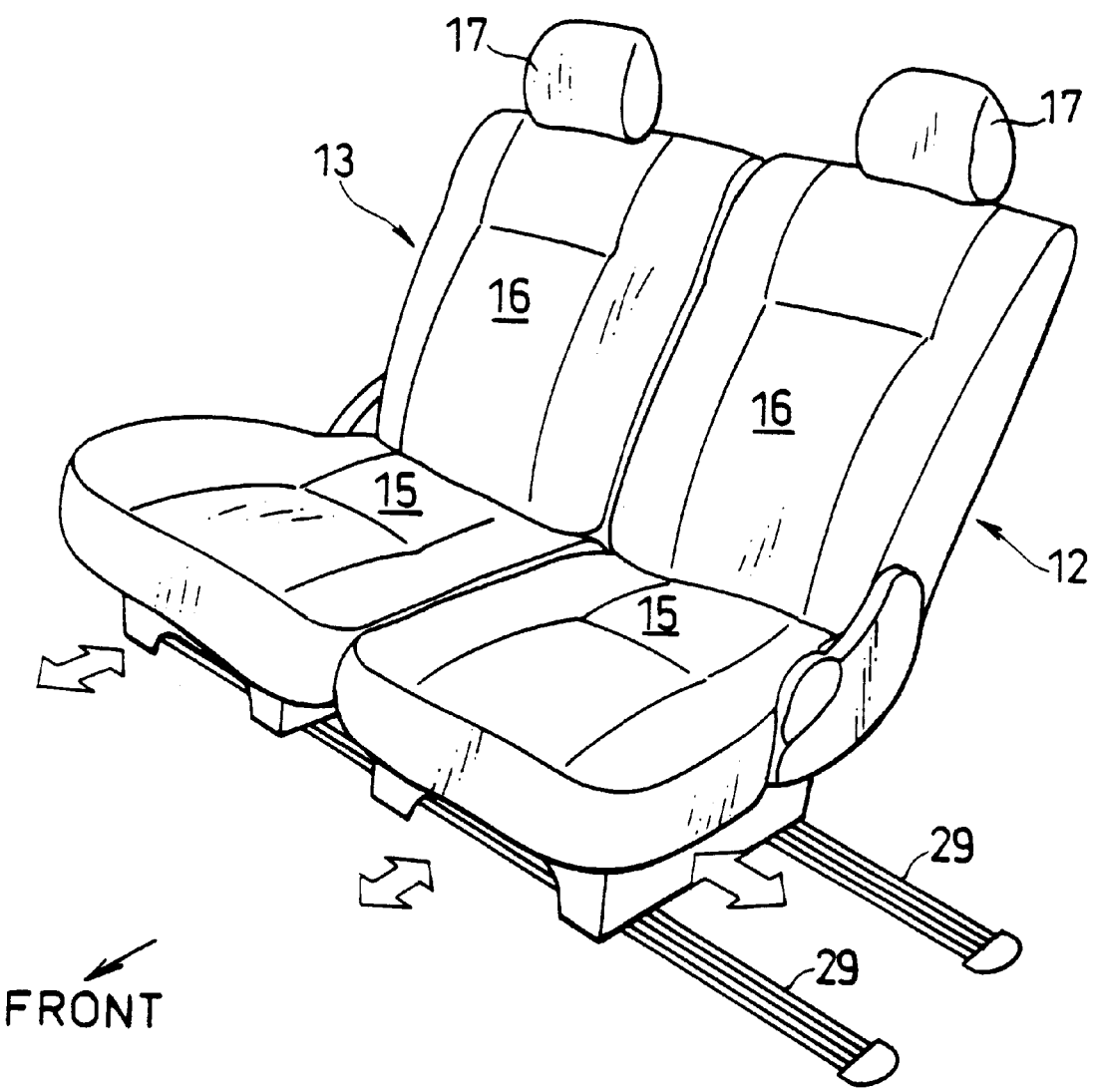
FIG. 3 is a perspective view of a center row of seats.
Figure 4:
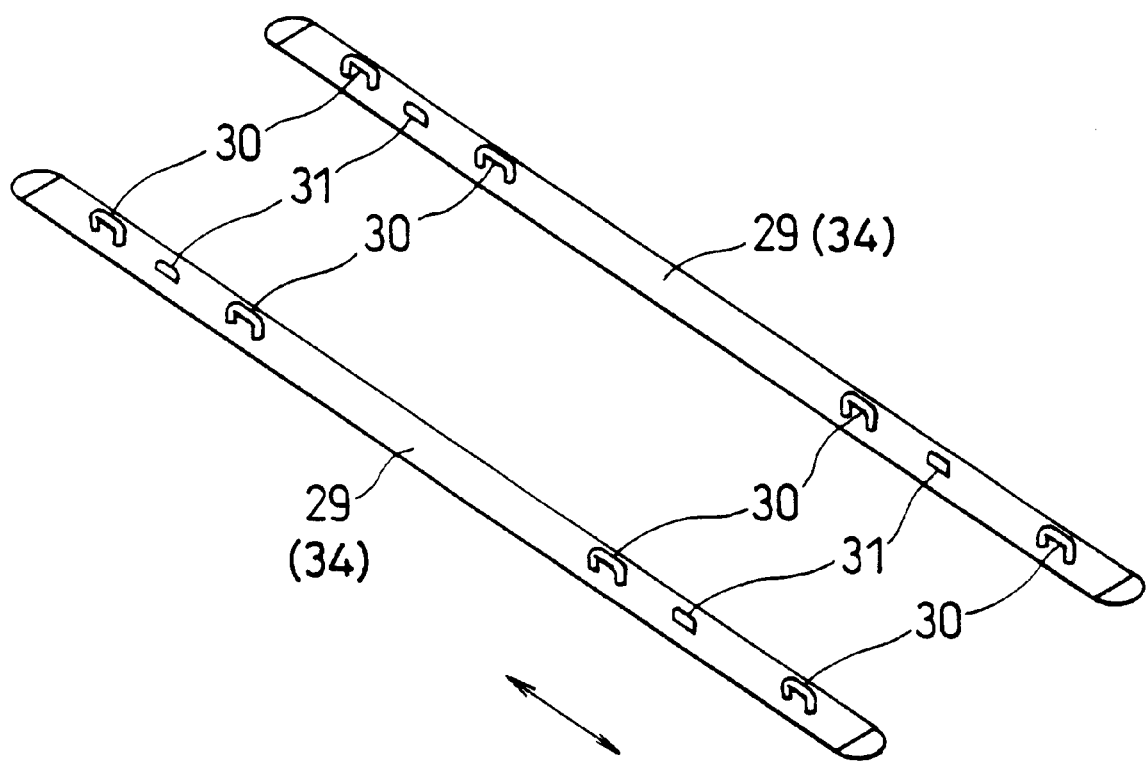
FIG. 4 is a perspective view of slide rails extending in the lateral direction of the vehicle wherein the seats are removed.

Referring to FIGS. 3 and 4, there are provided perspective views showing lateral slide rails 29 for the center row seats 12, 113. The slide rails 29 are buried in the floor parallel with each other to extend in the lateral direction. The slide rails 29 are provided with strikers 30 and lock and lever mount 31 for mounting the center row seats at a desired position. Each of the seats is formed with a hook 33 for engaging the striker 30 and a lock and lever structure for engaging the lock and lever mount 31.

Figure 5:
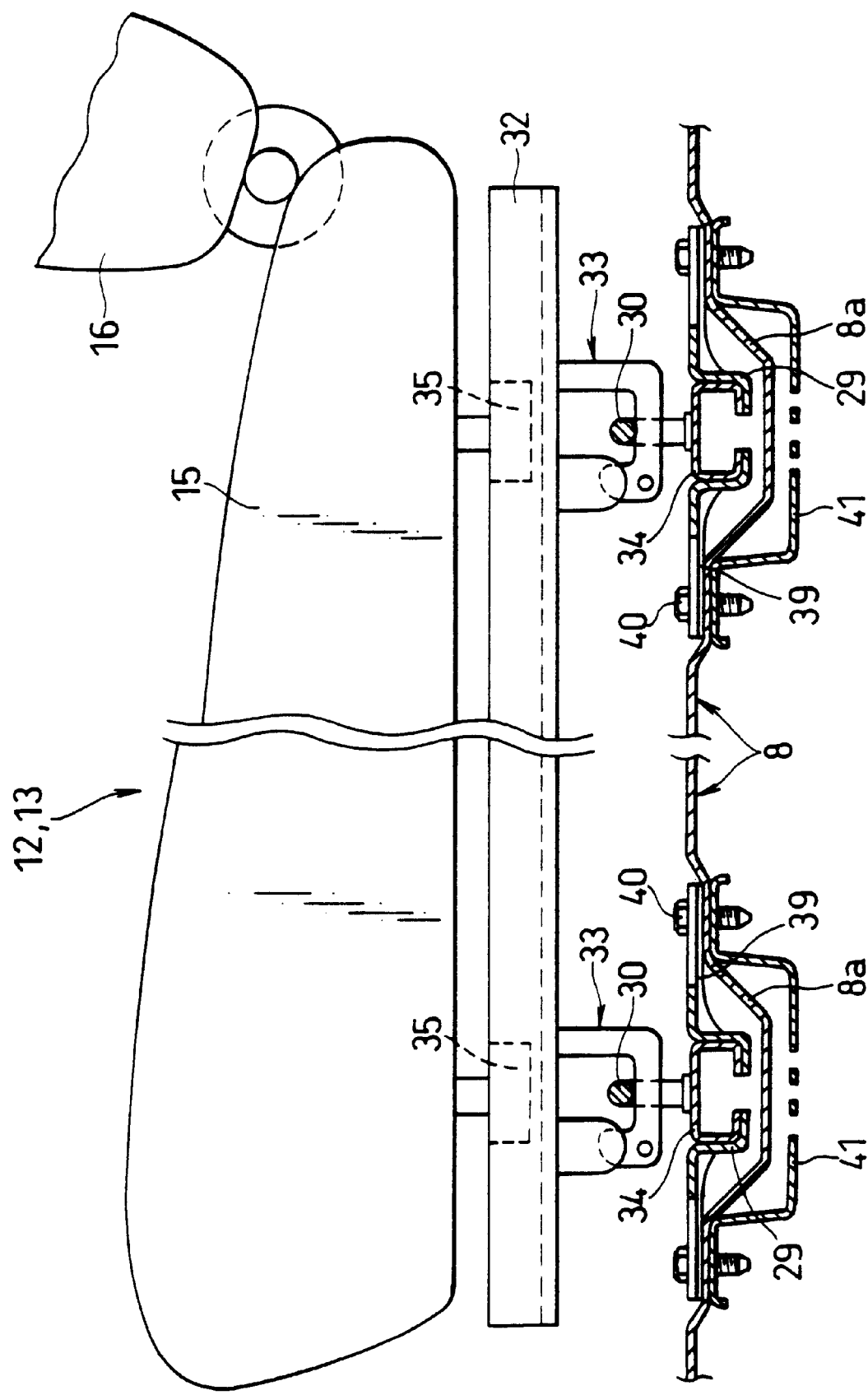
FIG. 5 is a sectional view showing a relationship between the longitudinal slide rails and the lateral slide rails.
Figure 6:
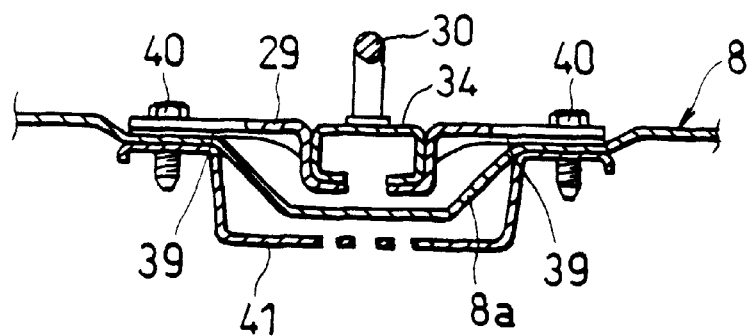
FIG. 6 is a sectional view showing a joint structure of strikers for mounting the seats and the lateral slide rails.

In FIG. 5, there is generally shown a relationship between the lateral slide rails 29 and longitudinal slide rails 32. As shown in FIG. 5, the longitudinal rails 32 are fixed to the center row seat 12, 13. To a lower side of each of the slide rails 32 is fixed a hook 33 which is brought into engagement with the rail 29. As shown in FIG. 6, the slide rail 29 is slidably provided with a slide guide 34 for supporting the striker 30 which is brought into engagement with the hook 33 so that the right and left center row seats 12 and 13 are movable in the lateral direction along the lateral slide rails 29.

Figure 7:
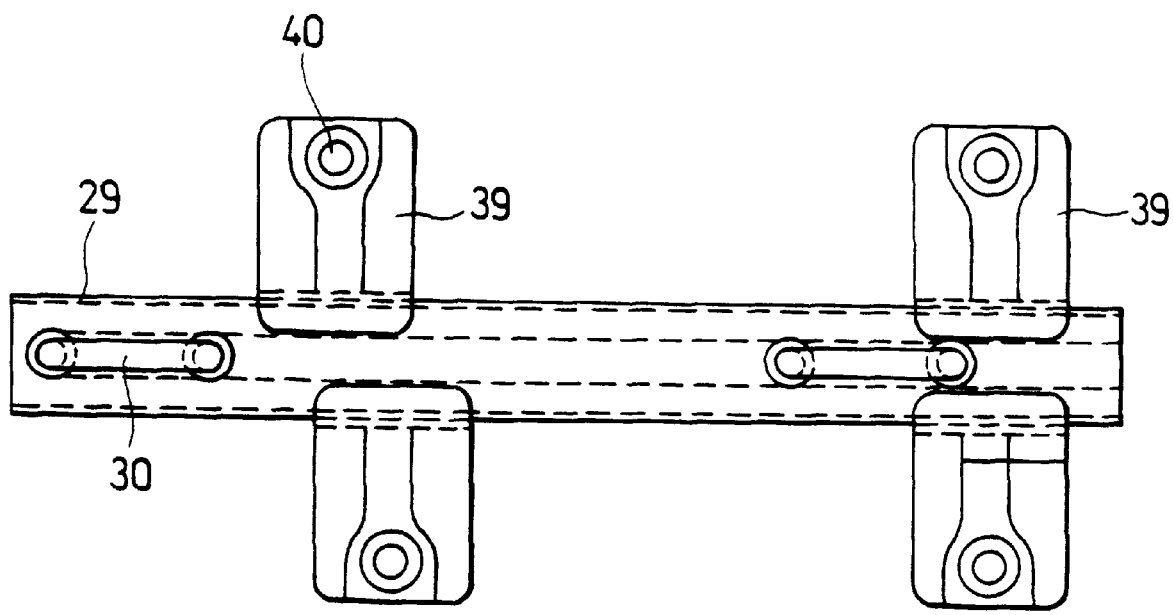
FIG. 7 is a plan view showing a mount of the lateral slide rails.

The lateral slide rails 29 are buried so as to be installed within a pair of recesses 8a, 8a formed on the floor panel 8. Referring further to FIG. 7, the slide rails 29 are constituted by a pair of long panel members of substantially S like configuration in section. The panel members are supported by the brackets 39 which are fixed to the floor panel by means of bolts. The brackets 39 are disposed at a predetermined interval in the lateral direction, fixed to a horizontal flange portion of the panel member forming the slide rail 29 at one end for supporting the panel member and fixed to the floor panel 8 through bolts 40.

As shown in FIG. 6, beneath the recess of the floor panel is positioned a cross member 41 of a channel configuration which is fixed to the slide rails 29 at opposite ends so that a cross sectioned panel structure extending in the lateral directions is formed by the cross member 41 and a lower surface of the floor panel 8.

An upper surface of the slide rail 29 is substantially aligned with the upper surface of the floor panel 8. As a result, when the center low seats 12 and 13 are removed, a substantially flat floor surface is formed although the strikers 30 and the mounts 31 are slightly projected upwardly.

When the seats 12, 13 are slid with guides 35 which engage the longitudinal slide rails 32, the seats 12 and 13 can be moved in the longitudinal direction of the vehicle along the longitudinal rails 32. On top of that, the center row seats 12, 13 can be removed by disengaging the hook 33 form the strikers 30.

Further, in the illustrated embodiment, the front row seats 9 and 10 are also removable. These seats can be mounted oppositely longitudinally.

Hereinafter, with the vehicle structure having the above seat device, how to utilize the cabin space is to be explained.

A basic seat arrangement of the illustrated vehicle is, as shown in FIG. 1, of a captain mode in which the front row seats 9 and 10, the center row seats 12 and 13, and the rear row seat 14 are all arranged for a forward looking attitude. In this case, the center row seats 12 and 13 are fixed to produce a distance in between.

Figure 8:
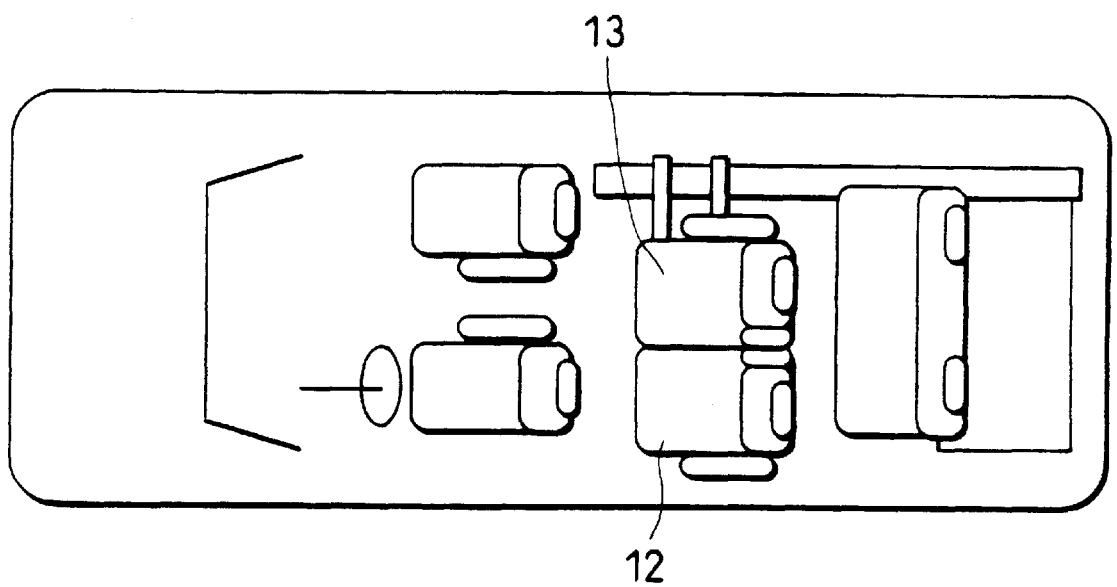
FIG. 8 is a plan view showing a condition of the cabin.

As shown in FIG. 8, it is possible to provide so called a bench mode in which one of the seats 12 and 13 is slid in the lateral direction to either one side so that two seats 12 and 13 are positioned at one side in contact with each other with regard to the lateral direction of the vehicle 1.

As shown in FIG. 9, with the bench mode, the seats 12, 13 and 14 are all entirely folded to establish a two seating vehicle condition. With this condition, the cabin space rearward of the front row seats 9 and 10 can be widely opened so that a big amount of luggage can be loaded.

Figure 10A:
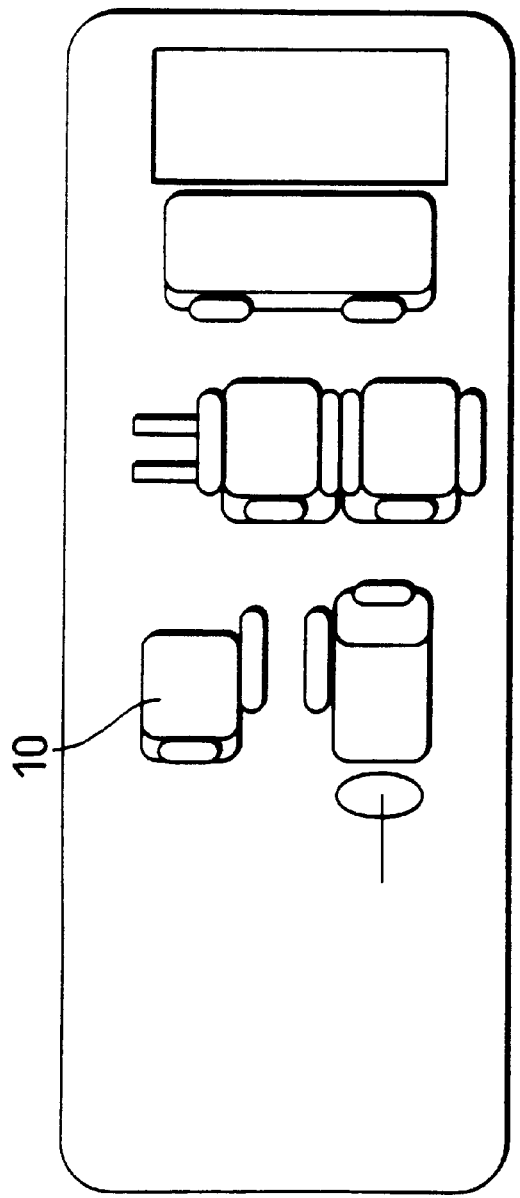
FIG. 10 is a plan view and elevation view showing a further condition of the cabin.
Figure 10B:
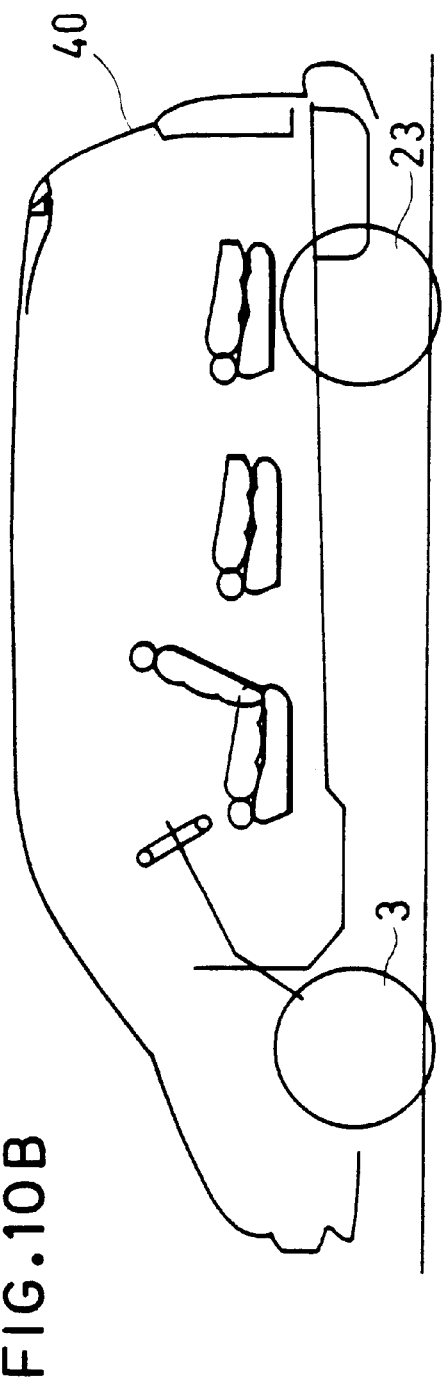

In addition, as shown in FIG. 10, the assistant's seat can be entirely folded to obtain a further open space in the cabin. As shown in FIG. 11, the center row seats 12 and 13 are moved laterally toward either one side of the cabin so as to be brought into contact with each other and entirely folded. With this arrangement, flat back surfaces of the seat backs 16b of the seats 12 and 13 can be utilized like a table. In this case, if the center row seats 12 and 13 are constituted in a manner that the seat backs 16 are formed with hard and horizontal flat surfaces in the back sides when entirely folded, the back sides of the seat backs of the center row seats 12 and 13 can be effectively used like a table.

Figure 12A:
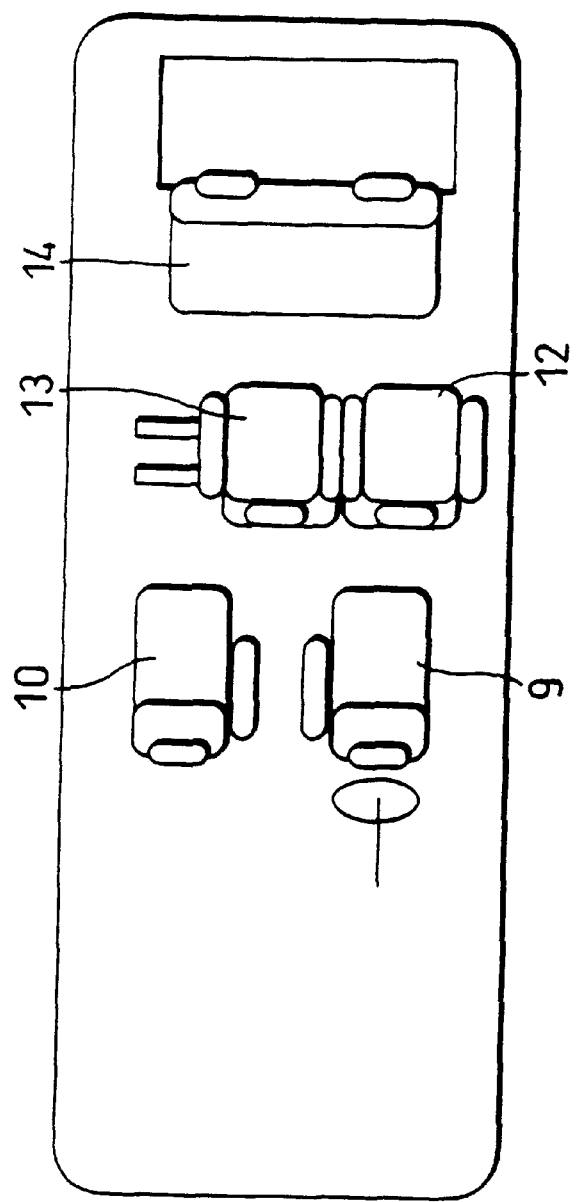
FIG. 12 is a plan view and elevation view showing a further condition of the cabin.
Figure 12B:
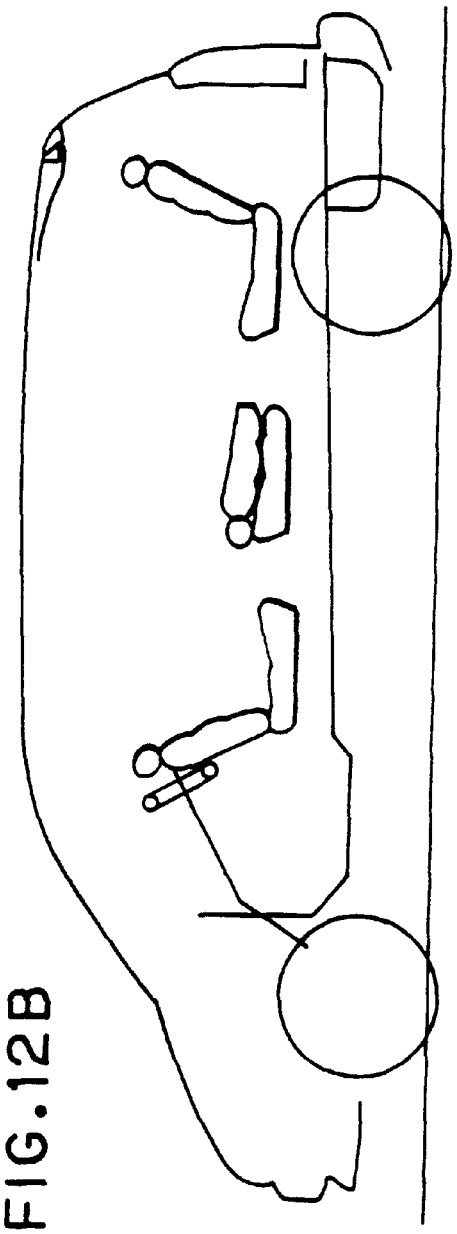
Figure 14A:
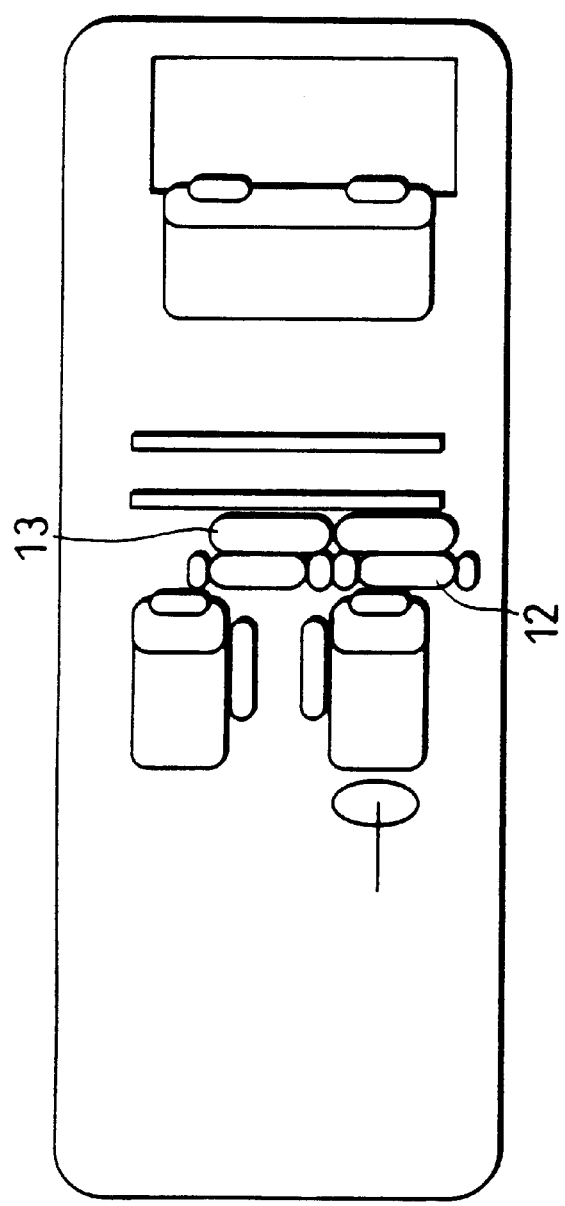
FIG. 14 is a plan view and elevation view showing a further condition of the cabin.
Figure 14B:
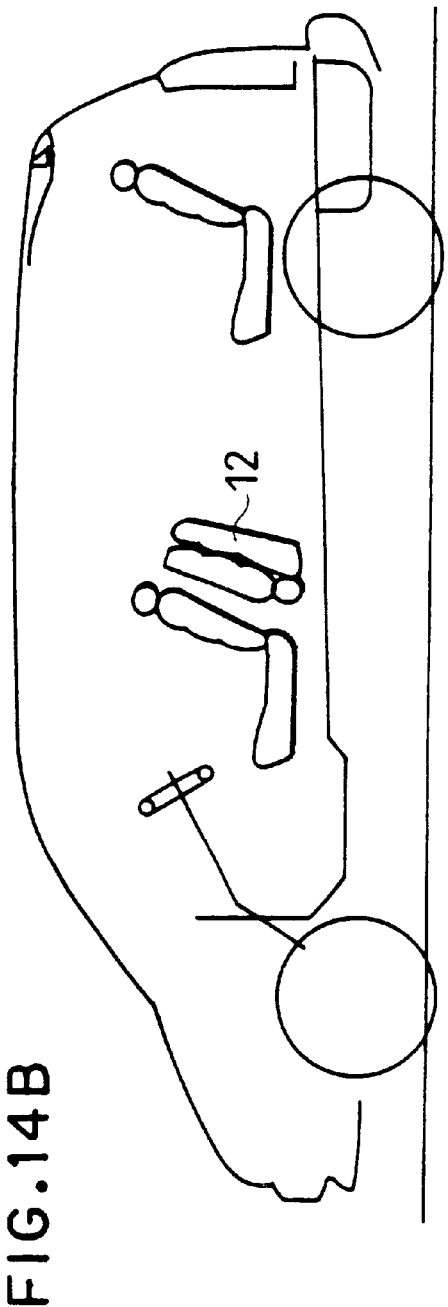

Further, as shown in FIG. 12, when the front row seats 9 and 10 are arranged oppositely in the longitudinal direction of the vehicle and the center row seats 12 and 13 are entirely folded, a face to face mode can be established in which the persons seated in the front row seats 9 and 10 face the persons seated in the rear row seat 14 over the center row seats 12 and 13. In FIG. 13, a condition is shown that the center row seats 12 and 13 are removed. With this arrangement, a widely open space can be obtained forward of the rear row seat 14. The removed center row seats 12 and 13 can be stored in the storage pan 20. Alternatively, they can be arranged rearward of the front row seats 9 and 10 with the entirely folded condition as shown in FIG. 14.

Figure 15A:
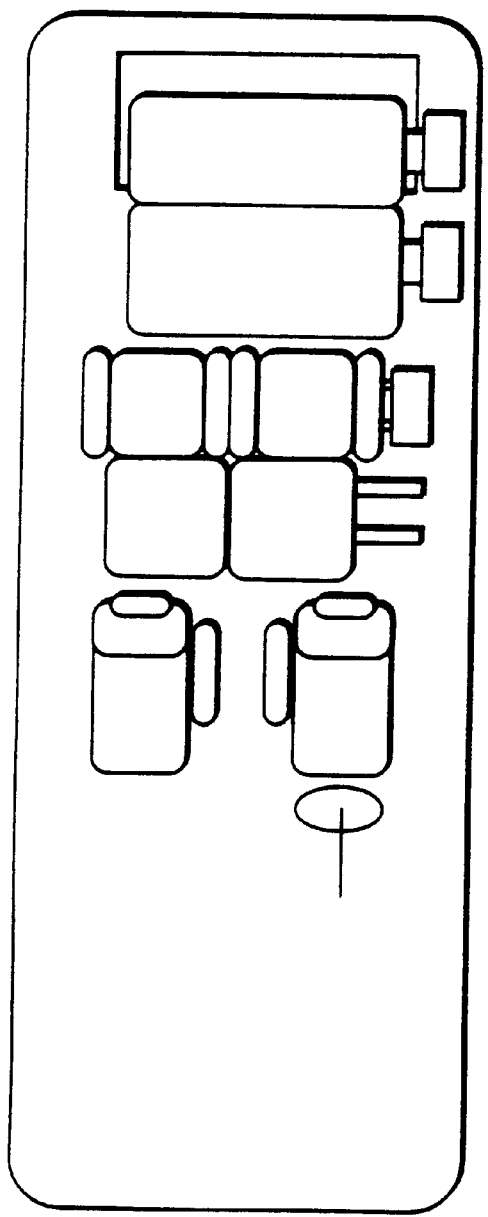
FIG. 15 is a plan view and elevation view showing a further condition of the cabin.
Figure 15B:
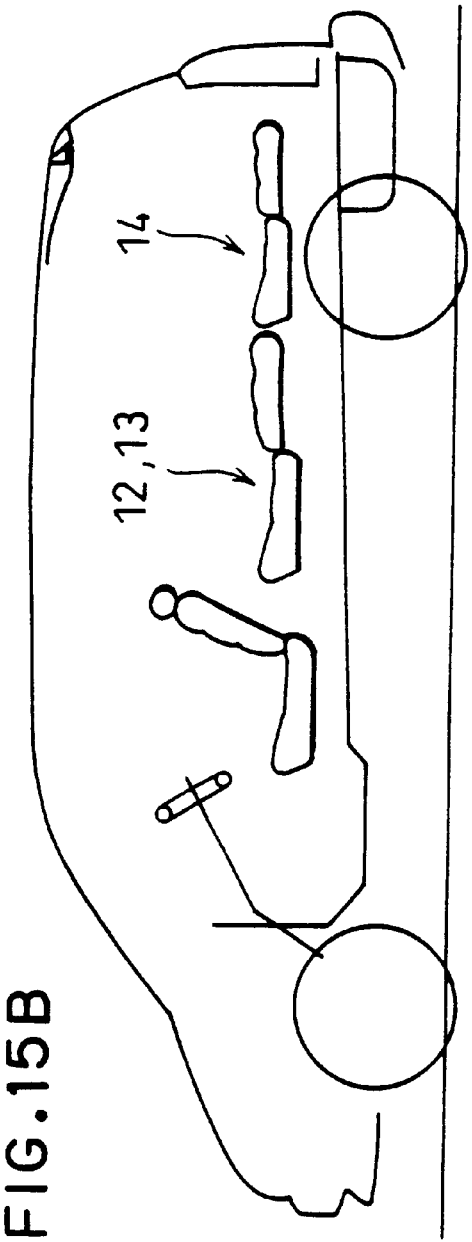

Further, as shown in FIG. 15, when the center row seats 12 and 13 and the rear row seat 14 take full flat conditions, it is possible to establish a bed like condition by means of the seats. In this case, if the head rests 17 are able to be removed and mounted laterally thereto, a wider flat bed like condition can be established with this arrangement.

Figure 16A:
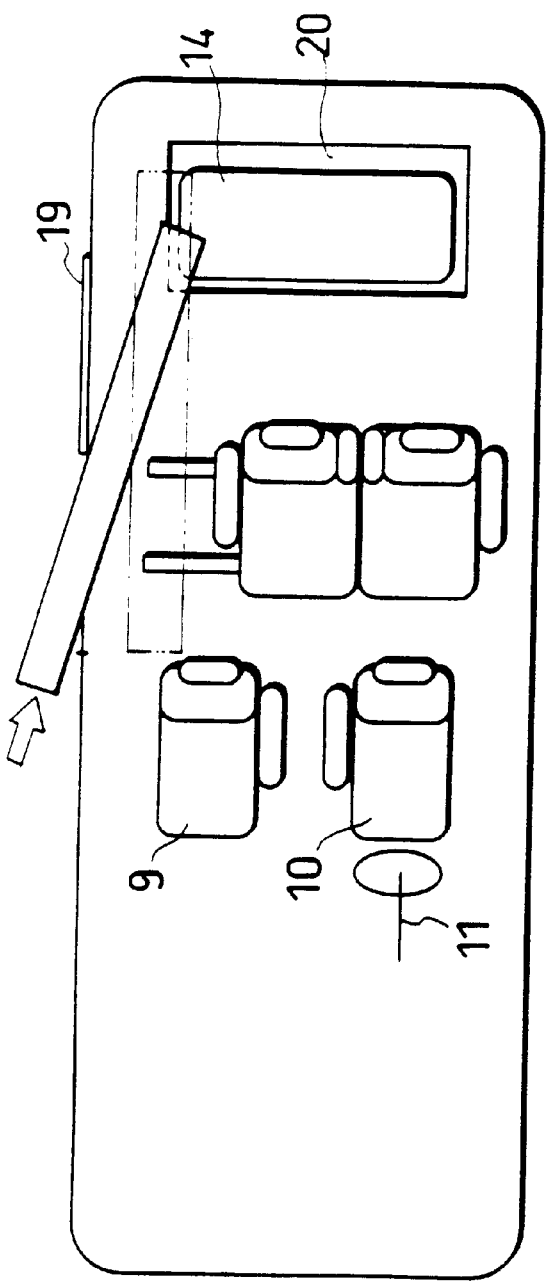
FIG. 16 is a plan view and elevation view showing a further condition of the cabin.
Figure 16B:
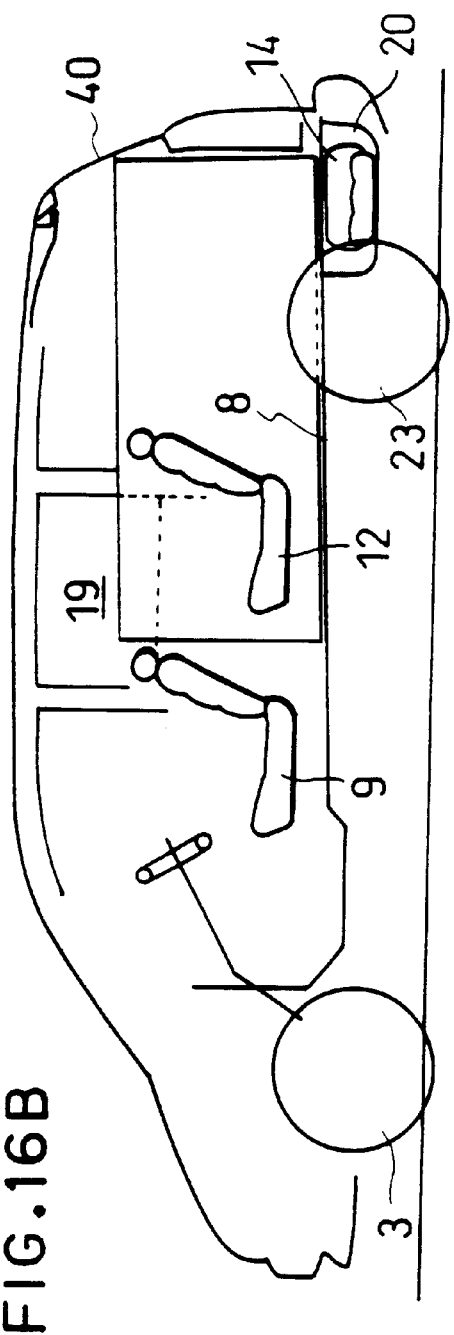

Further, as shown in FIG. 16, when the rear row seat 14 is retracted into the storage pan 20, it is possible to obtain a widely open space rearward of the center row seats 12 and 13 in the cabin. With this arrangement, a widely open space of a flat surface in line with the floor surface can be formed at a side of the side door extending from the rearward of the assistant's seat to the rear end of the cabin space. As a result, a long and wide luggage such as ski, table, mattress can be loaded along a longitudinal and vertical side of the vehicle as shown in FIG. 16. This is because a full space from the floor surface to a ceiling of the cabin can be obtained with no obstacle.

Figure 17A:
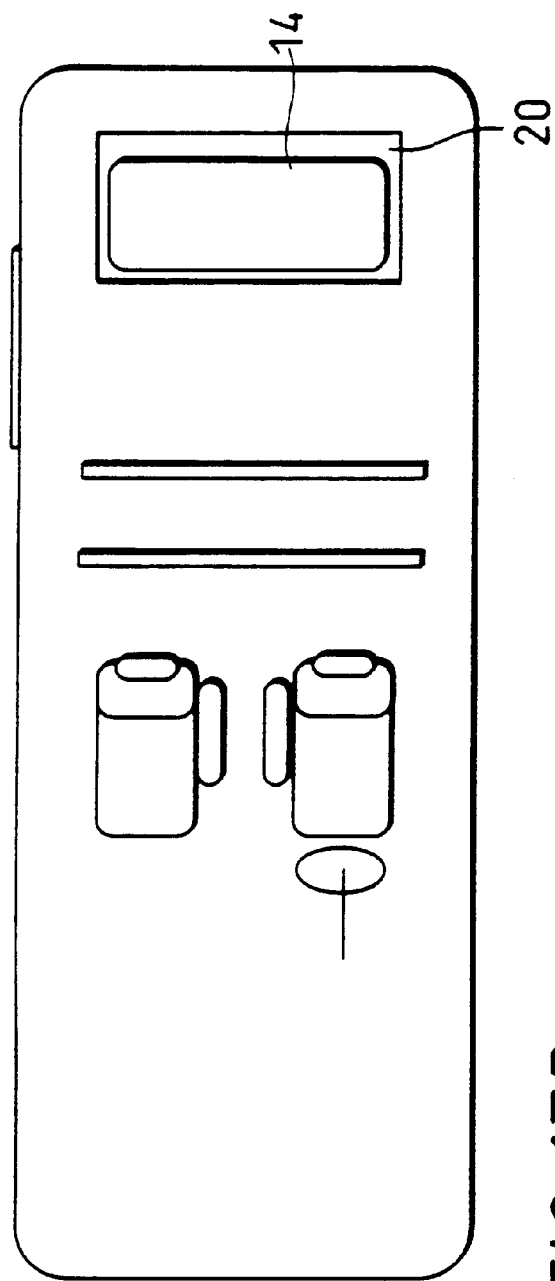
FIG. 17 is a plan view and elevation view showing a further condition of the cabin.
Figure 17B:
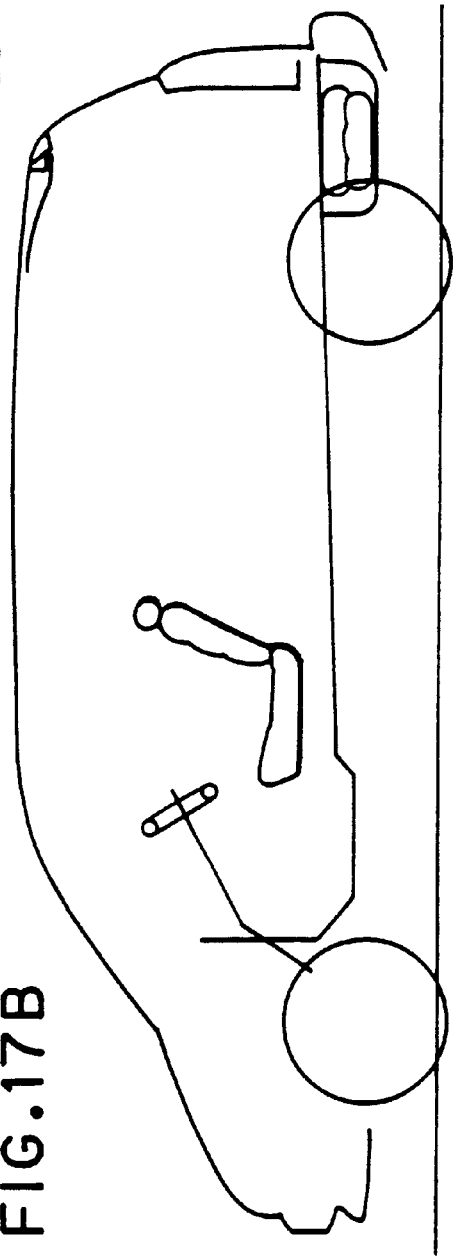

Further, the center row seats 12 and 13 can be removed with the rear seat 14 being retracted in the storage pan 20 as shown in FIG. 17. As a result, a flat and widely open space in line with a floor level can be established rearward the front row seats with a full width to the rear end of the cabin. Such wide and open space of the cabin cannot be established in any conventional passenger vehicle. Thus, the vehicle according to the present invention can be used like a truck. In this case, the center row seats 12 and 13 can be stored rearward of the front row seats 9 and 10 with an entire folded condition (FIG. 18). In addition, when the front row seats 9 and 10 and the center row seats 12 and 13 are fully reclined to establish substantially full flat condition with the rear row seat 14 being arranged for a normal seating condition, it is possible to obtain a broad and open bed like condition forward the rear row seat 14. In this case, if the head rest 17 is removed and arranged between the seats, it is possible to form a wide and flat surface substantially completely covered by the seats and head rests.

Figure 20A:
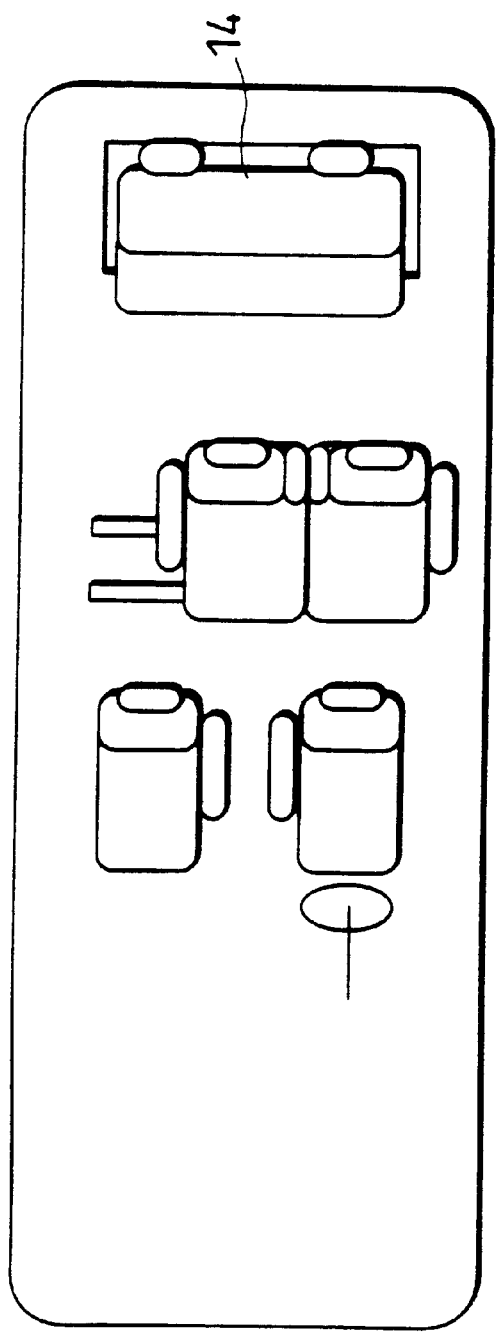
FIG. 20 is a plan view and elevation view showing a further condition of the cabin.
Figure 20B:
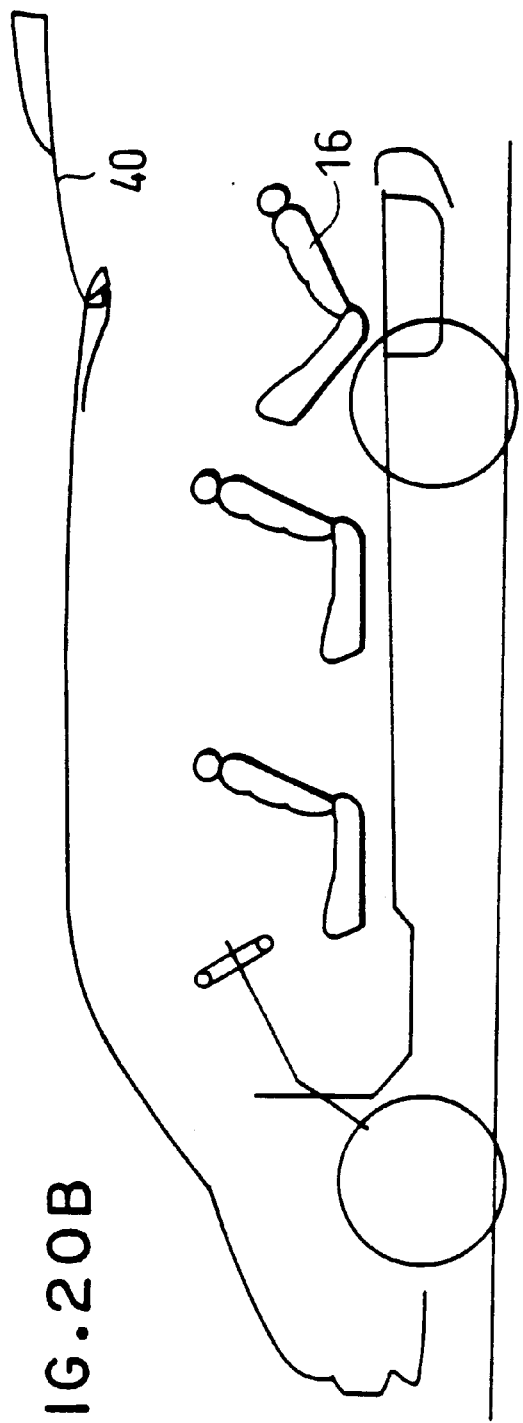

As shown in FIG. 20, when the rear row seat 14 is rolled back with keeping the normal seating attitude around a hinge 37 which is disposed at a rear side of the seat so as to be seated on the seat back 16 in lieu of the seat cushion 15 with an inverted condition.

Figure 21A:
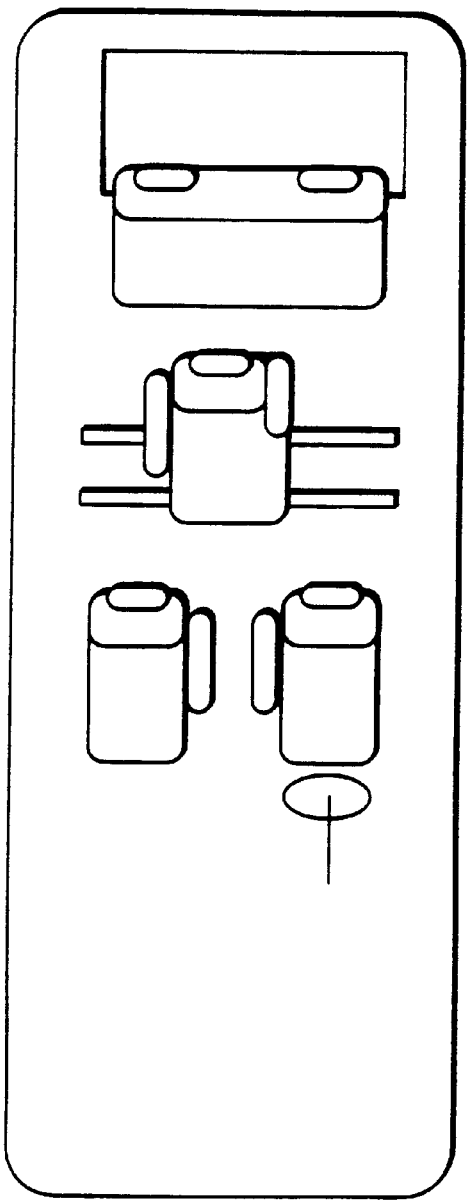
FIG. 21 is a plan view and elevation view showing a further condition of the cabin.
Figure 21B:
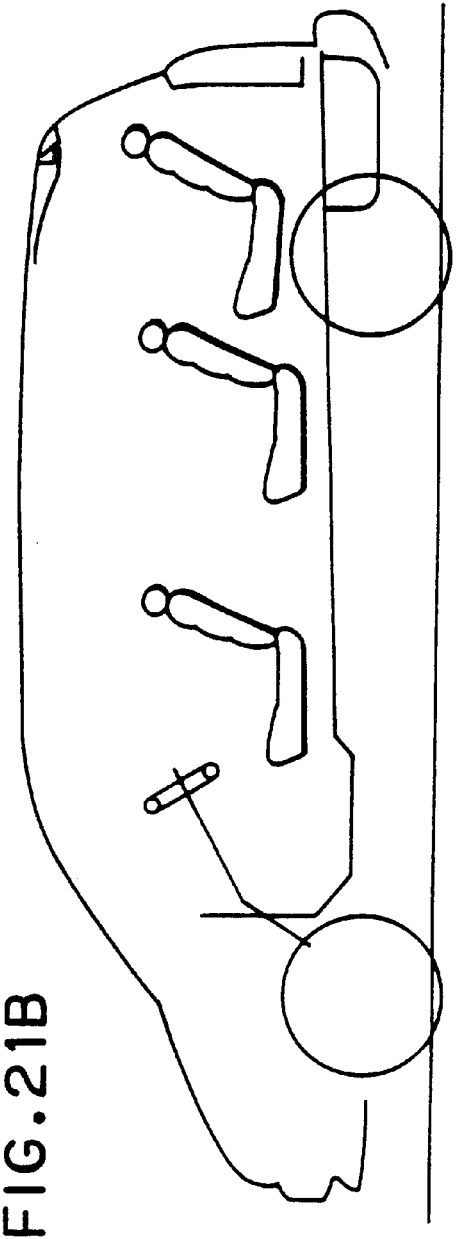
Figure 23A:
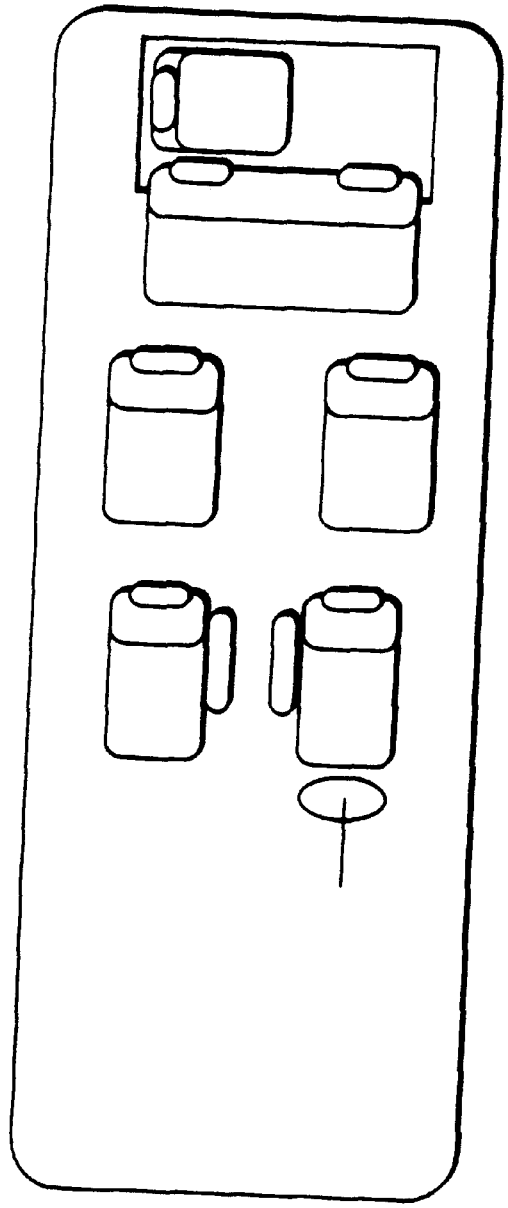
FIG. 23 is a plan view and elevation view showing another condition of the cabin in accordance with the embodiment of the present invention of FIG. 22.
Figure 23B:
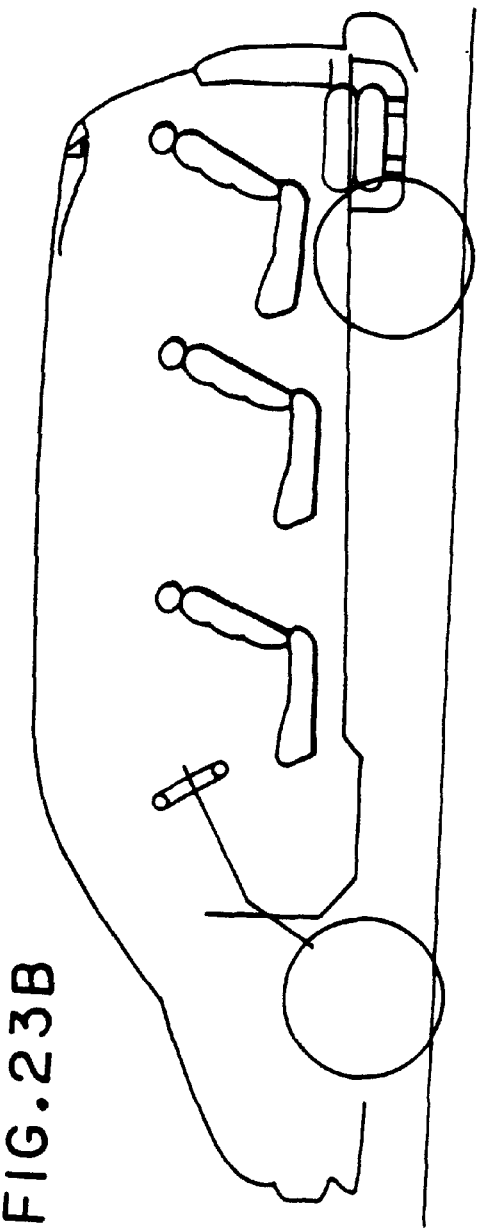

In this case, the seat back 16 takes a horizontal state. The storage pan 20 positioned under beneath the seat back 16 so that a person can sit on the seat back 16 with a rear door 40 open. Further, as shown in FIG. 21, one of the center row seats 12 and 13 can be removed to leave only one.

Referring to FIG. 22, there is shown another embodiment in accordance with the present invention. In this embodiment, the center row seats are constituted by three seats in which a middle seat 36 is not mounted on the rails 29 and removably mounted. Therefore, when the middle seat 36 is removed, it is possible to utilize the cabin space with broad variations as mentioned in connection with the former embodiment. When the middle seat 36 is attached, a wider bench mode can be established with the center row seats 12, 13 and 36.

As mentioned above, according to the present invention, the cabin space can be utilized with many variations as a whole so as to improve the operability of the cabin space drastically. Thus, the utility of the vehicle can be greatly expanded.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A seat arrangement of a vehicle comprising:

a floor surface extending across a fill cabin space of the vehicle;

front row seats, center row seats and a rear row seat disposed in a longitudinal direction of the vehicle on the floor surface;

a storage pan extending rearward the rear row seat and downward a level of the floor surface;

the front row seats being disposed with a space therebetween;

the center row seats including two seats disposed in a lateral direction of the vehicle, the center row seats being disposed so as to be switched between a first mode in which the two seats have a space therebetween and a second mode in which the two seats are offset to one side of the vehicle with regard to the lateral direction and contact with each other;

the rear row seat being disposed so as to be received in the seat storage pan;

at least one of the center row seats being movable in both the longitudinal and lateral directions, the center row seat including a longitudinal slide rail for allowing a longitudinal movement of the center row seat and a lateral slide rail for allowing a lateral movement of the center row seat, the longitudinal slide rail being disposed over the lateral slide rail;

the center row seats both being removable from the floor surface.

2. A seat arrangement of vehicle as recited in claim 1, wherein a relatively wide rectangular floor space extending rearward the front row seats is formed when the center row seats are removed from the floor surface and the rear row seat is received in the seat storage pan.

3. A seat arrangement of a vehicle as recited in claim 1, wherein a reverse T-shaped floor space extending from the space between the two center row seats to the rear part of the cabin space is formed when the center row seats are disposed in the first mode and the rear row seat is received in the seat storage pan, a L-shaped floor space extending from the space in the other side of the vehicle with regard to the lateral direction in the center part of the cabin space to the rear part of the cabin space is formed when the center row seats are disposed in the second mode and the rear row seat is received in the seat storage pan, and a relatively wide rectangular floor space extending rearward the front row seats is formed when the center row seats are removed from the floor surface and the rear row seat is received in the seat storage pan.

4. A seat arrangement of a vehicle comprising:

a floor surface extending across a fill cabin space of the vehicle;

front row seats, center row seats and a rear row seat disposed in a longitudinal direction of the vehicle on the floor surface;

a storage pan extending rearward the rear row seat and downward a level of the floor surface;

the front row seats being disposed with a space therebetween;

the center row seats including two seats disposed in a lateral direction of the vehicle, the center row seats being disposed so as to be switched between a first mode in which the two seats have a space therebetween and a second mode in which the two seats are offset to one side of the vehicle with regard to the lateral direction and contact with each other;

the rear row seat being disposed so as to be received in the seat storage pan;

at least one of the center row seats being movable in both the longitudinal and lateral directions, the center row seat including a longitudinal slide rail for allowing a longitudinal movement of the center row seat and a lateral slide rail for allowing a lateral movement of the center row seat, the longitudinal slide rail being disposed over the lateral slide rail;

said lateral slide rail of the center row seat has an upper surface which is substantially aligned with the floor surface.

5. A seat arrangement of a vehicle comprising:

a floor surface extending across a full cabin space of the vehicle;

front row seats, center row seats and a rear row seat disposed in a longitudinal direction of the vehicle on the floor surface;

a storage pan extending rearward the rear row seat and downward a level of the floor surface;

the front row seats being disposed with a space therebetween;

the center row seats including two seats disposed in a lateral direction of the vehicle, the center row seats being disposed so as to be switched between a first mode in which the two seats have a space therebetween and a second mode in which the two seats are offset to one side of the vehicle with regard to the lateral direction and contact with each other;

the rear row seat being disposed so as to be received in the seat storage pan;

at least one of the center row seats being movable in both the longitudinal and lateral directions, the center row seat including a longitudinal slide rail for allowing a longitudinal movement of the center row seat and a lateral slide rail for allowing a lateral movement of the center row seat, the longitudinal slide rail being disposed over the lateral slide rail;

said front row seats are removable from the floor surface and are able to be mounted oppositely longitudinally on the surface after being removed.

6. A seat arrangement of a vehicle comprising:

a floor surface extending across a full cabin space of the vehicle;

front row seats, center row seats and a rear row seat disposed in a longitudinal direction of the vehicle on the floor surface;

a storage pan extending rearward the rear row seat and downward a level of the floor surface;

the front row seats being disposed with a space therebetween;

the center row seats including two seats disposed in a lateral direction of the vehicle, the center row seats being disposed so as to be switched between a first mode in which the two seats have a space therebetween and a second mode in which the two seats are offset to one side of the vehicle with regard to the lateral direction and contact with each other;

the rear row seat being disposed so as to be received in the seat storage pan;

at least one of the center row seats being movable in both the longitudinal and lateral directions, the center row seat including a longitudinal slide rail for allowing a longitudinal movement of the center row seat and a lateral slide rail for allowing a lateral movement of the center row seat, the longitudinal slide rail being disposed over the lateral slide rail;

said rear row seat is provided with a seat cushion, a seat back and a hinge which is disposed at a rear of the rear row seat, when the rear row seat being rolled back with keeping a normal seating attitude around the hinge, the rear row seat being formed so as to be seated on the seat back in lieu of the seat cushion with an inverted condition.

7. A seat arrangement of a vehicle comprising:

a floor surface extending across a full cabin space of the vehicle;

front row seats, center row seats and a rear row seat disposed in a longitudinal direction of the vehicle on the floor surface;

a seat storage pan extending rearward the rear row seat and downward a level of the floor surface;

the front row seats being disposed with a space therebetween;

the center row seats including two seats disposed in a lateral direction of the vehicle, the center row seats being disposed so as to be switched between a first mode in which the two seats have a space therebetween and a second mode in which the two seats are offset to one side of the vehicle with regard to the lateral direction and contact with each other;

the rear row seat being disposed so as to be received in the seat storage pan; and a lateral slide rail for allowing a lateral movement of the center row seat, the lateral slide rail being provided with a mechanism through which the center row seat is removed from the lateral slide rail.

8. A seat arrangement of a vehicle as recited in claim 35, wherein the center row seats are both removable from the floor surface.

9. A seat arrangement of a vehicle as recited in claim 36, wherein a reverse T-shaped floor space extending from the space between the two center row seats to the rear part of the cabin space is formed when the center row seats are disposed in the first mode and the rear row seat is received in the seat storage pan, a L-shaped floor space extending form the space in the other side of the vehicle with regard to the lateral directon in the center part of the cabin space to the rear part of the cabin space is formed when the center row seats are disposed in the second mode and the rear row seat is received in the seat storage pan, and a relatively wide rectangular floor space extending rear ward the front row seats is formed when the center row seats are removed from the floor surface and the rear row seat is received in the seat storage pan.

* * * * *